(12) United States Patent
Uchida

(10) Patent No.: US 8,730,380 B2
(45) Date of Patent: May 20, 2014

(54) IMAGING DEVICE, METHOD FOR CONTROLLING IMAGING DEVICE, AND COMPUTER-READABLE STORAGE MEDIUM

(71) Applicant: FUJIFILM Corporation, Tokyo (JP)

(72) Inventor: Akihiro Uchida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/027,880

(22) Filed: Sep. 16, 2013

(65) Prior Publication Data

US 2014/0016021 A1 Jan. 16, 2014

Related U.S. Application Data

(63) Continuation of application No. PCT/JP2012/057944, filed on Mar. 27, 2012.

(30) Foreign Application Priority Data

Mar. 31, 2011 (JP) ................................ 2011-079582

(51) Int. Cl.
H04N 5/232 (2006.01)
(52) U.S. Cl.
USPC ........................................ 348/349; 348/345
(58) Field of Classification Search
USPC ................................................ 348/345–349
See application file for complete search history.

(56) References Cited

U.S. PATENT DOCUMENTS

| 6,829,008 B1* | 12/2004 | Saga et al. ..................... 348/302 |
| 8,525,917 B2* | 9/2013 | Taniguchi ..................... 348/345 |
| 2008/0259202 A1* | 10/2008 | Fujii ............................. 348/345 |
| 2011/0157348 A1* | 6/2011 | Yamamoto ....................... 348/79 |
| 2012/0147238 A1* | 6/2012 | Kita et al. ..................... 348/302 |
| 2013/0021517 A1* | 1/2013 | Ui et al. ........................ 348/345 |
| 2013/0021519 A1* | 1/2013 | Hamada ........................ 348/349 |
| 2013/0120644 A1* | 5/2013 | Fujii ............................. 348/349 |

FOREIGN PATENT DOCUMENTS

| JP | 2010-139563 A | 6/2010 |
| JP | 2010-139942 A | 6/2010 |

OTHER PUBLICATIONS

International Search Report issued in PCT/JP2012/057944, dated Jun. 12, 2012.
Written Opinion of the International Searching Authority issued in PCT/JP2012/057944, dated Jun. 12, 2012.
International Search Report issued in PCT/JP2012/057944, dated Jun. 12, 2011.
Written Opinion of the International Searching Authority issued in PCT/JP2012/057944, dated Jun. 12, 2011.

* cited by examiner

*Primary Examiner* — Lin Ye
*Assistant Examiner* — Amy Hsu
(74) *Attorney, Agent, or Firm* — Birch, Stewart, Kolach & Birch, LLP

(57) ABSTRACT

During a period before focusing is instructed, contrast detection is used to detect positions at which focus evaluation values reach a peak in regard to detection regions obtained by dividing a region containing a region in which phase-difference detection pixels of an imaging element are disposed; when focusing is instructed, focus evaluation value peak positions of each of the detection regions are acquired; if an optical system is in a focused state, the number of detection regions whose deviation in focus evaluation value peak position is within a threshold value is counted; if the number of applicable detection regions is equal to or greater than a predetermined value, focus position detection and focus control are performed by phase-difference detection, and if the number of detection regions is less than the predetermined value, focus position detection and focus control are performed by contrast detection.

20 Claims, 15 Drawing Sheets

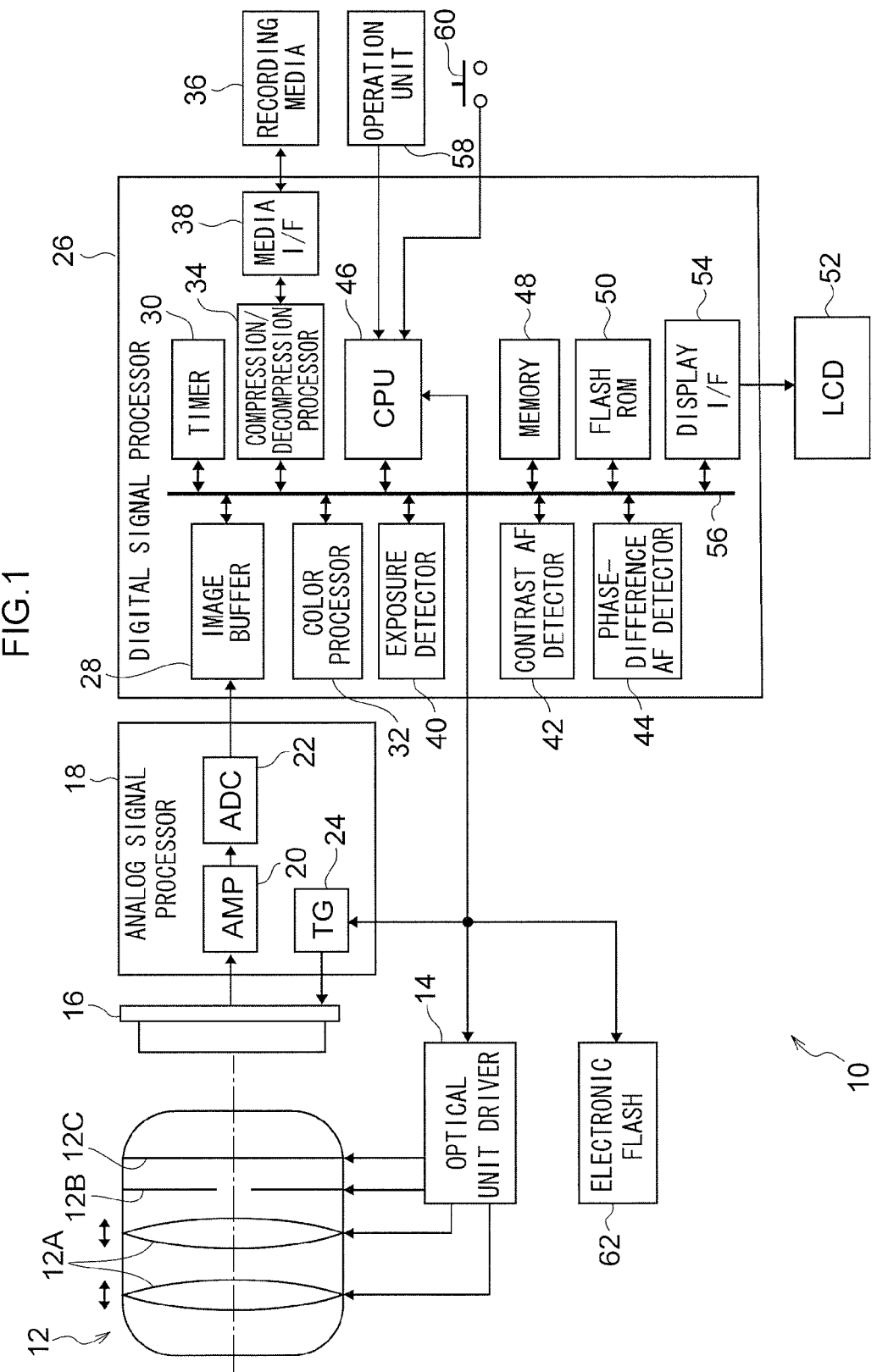

PHASE-DIFFERENCE DETECTION DIRECTION x

AMOUNT OF
PHASE DIFFERENCE

FIG.6

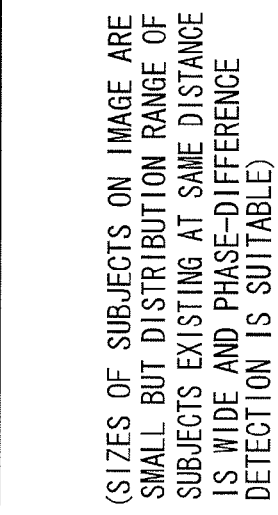
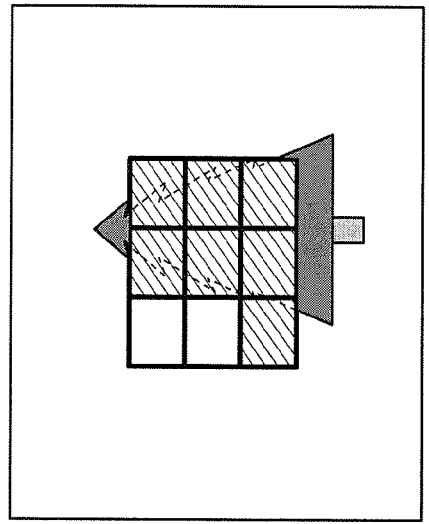
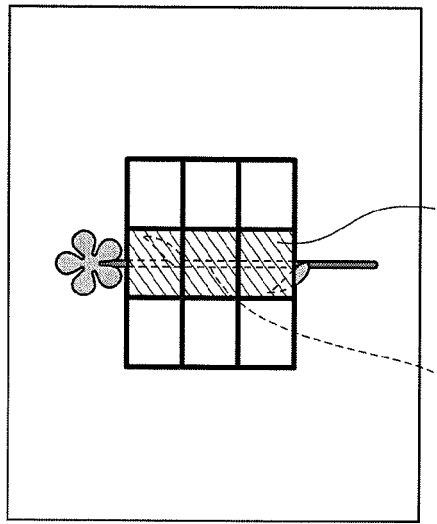

(1) CASE WHERE NUMBER OF DETECTION REGIONS WHOSE DEVIATION IN FOCUS EVALUATION VALUE PEAK POSITION IS WITHIN THRESHOLD VALUE IS LESS THAN MAJORITY (SIZE OF SUBJECT ON IMAGE IS SMALL AND PHASE-DIFFERENCE DETECTION IS UNSUITABLE)

REFERENCE DETECTION REGION DETECTION REGION WHOSE DEVIATION IN FOCUS EVALUATION VALUE PEAK POSITION FROM THAT OF REFERENCE DETECTION REGION IS WITHIN THRESHOLD VALUE (2) CASE WHERE NUMBER OF DETECTION REGIONS WHOSE DEVIATION IN FOCUS EVALUATION VALUE PEAK POSITION IS WITHIN THRESHOLD VALUE IS EQUAL TO OR GREATER THAN MAJORITY (SIZE OF SUBJECT ON IMAGE IS LARGE AND PHASE-DIFFERENCE DETECTION IS SUITABLE)

(3) CASE WHERE NUMBER OF DETECTION REGIONS WHOSE DEVIATION IN FOCUS EVALUATION VALUE PEAK POSITION IS WITHIN THRESHOLD VALUE IS EQUAL TO OR GREATER THAN MAJORITY (SIZES OF SUBJECTS ON IMAGE ARE SMALL BUT DISTRIBUTION RANGE OF SUBJECTS EXISTING AT SAME DISTANCE IS WIDE AND PHASE-DIFFERENCE DETECTION IS SUITABLE)

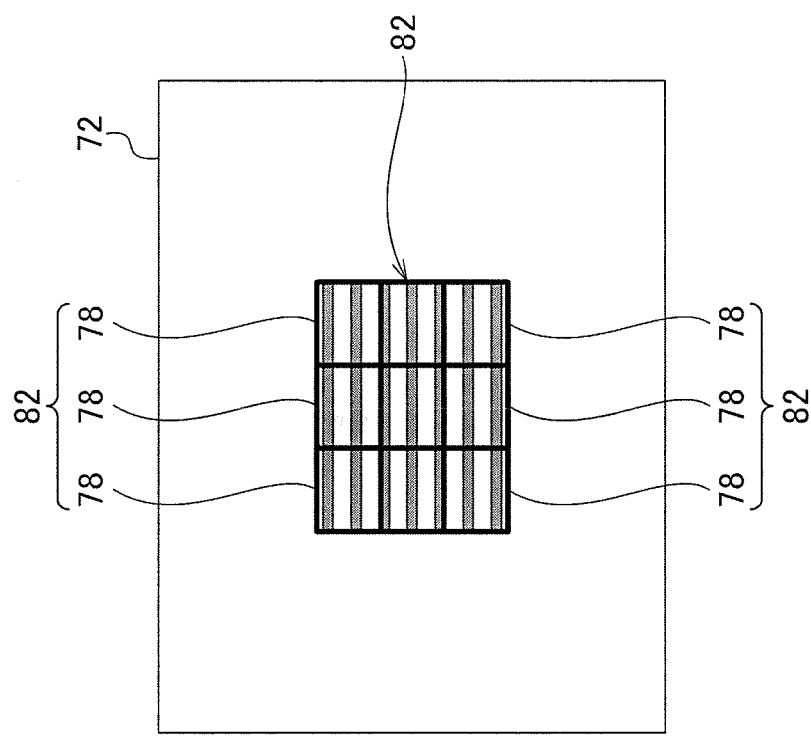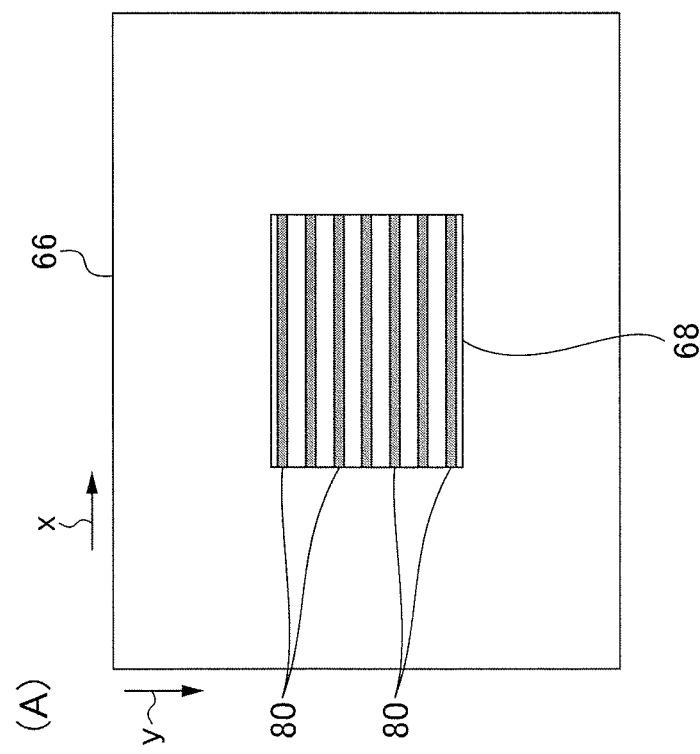

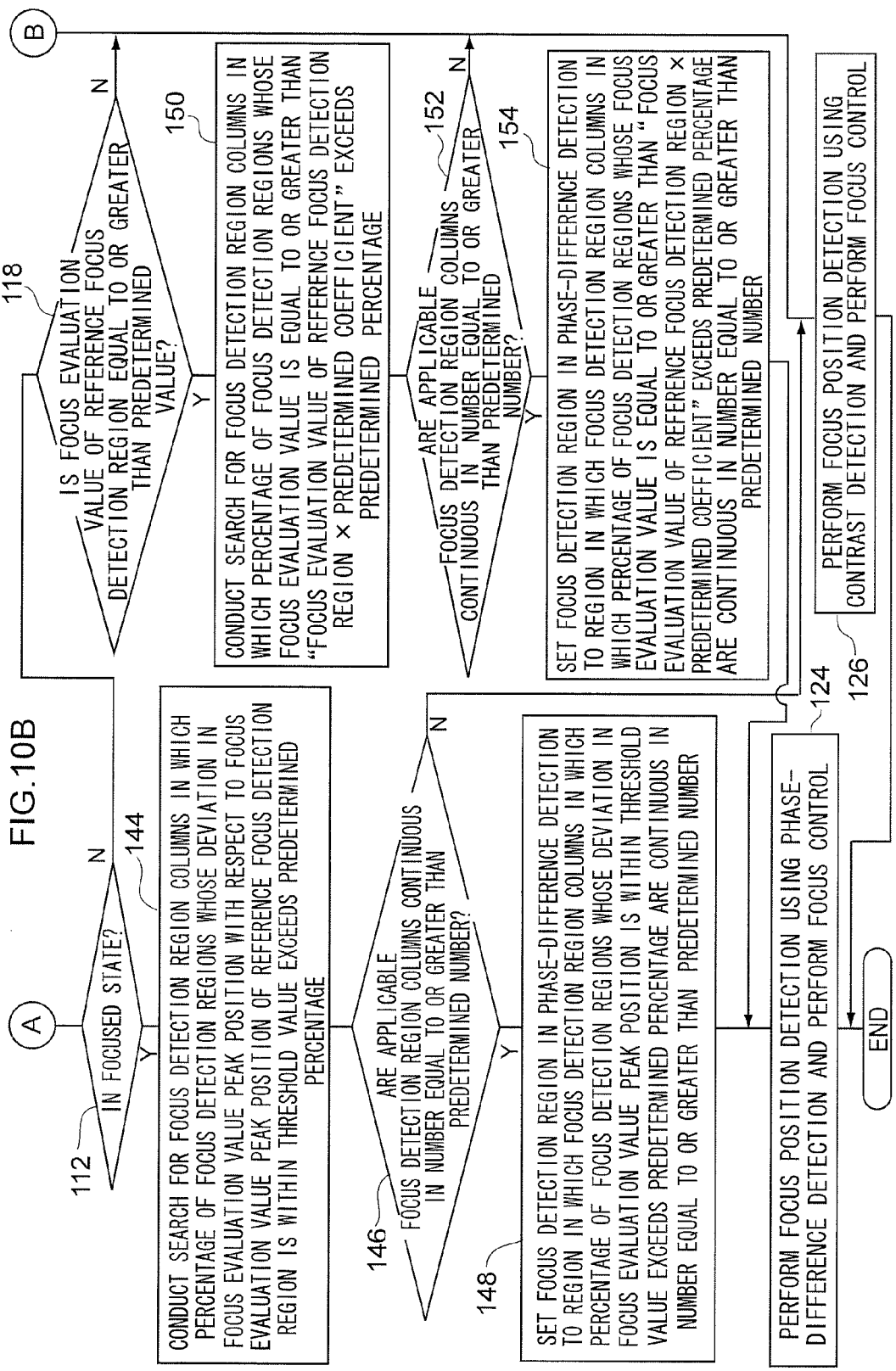

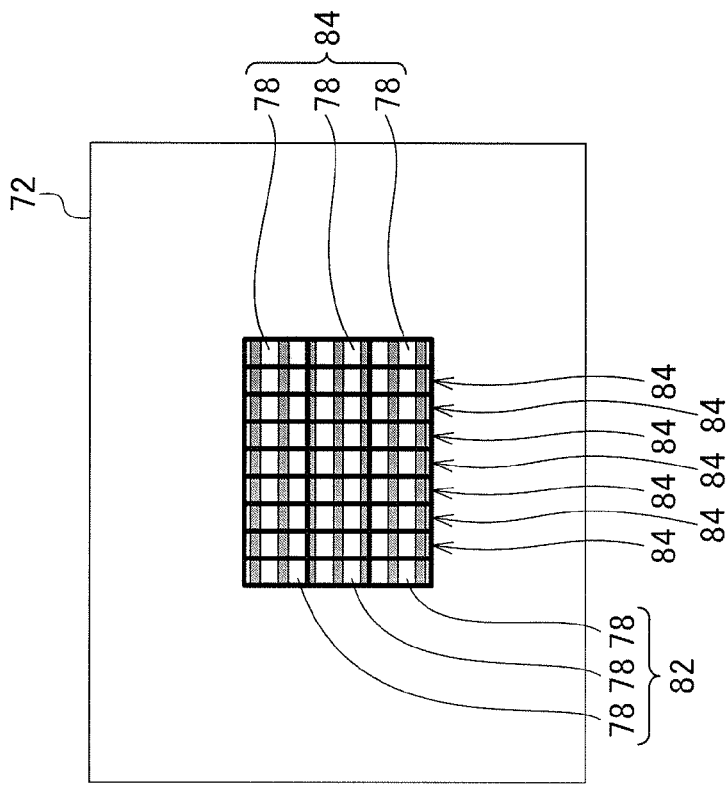
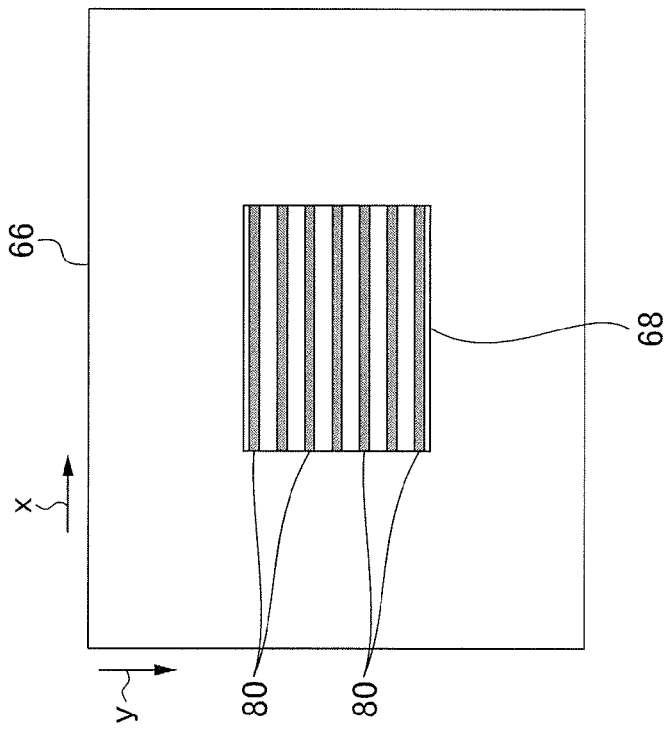

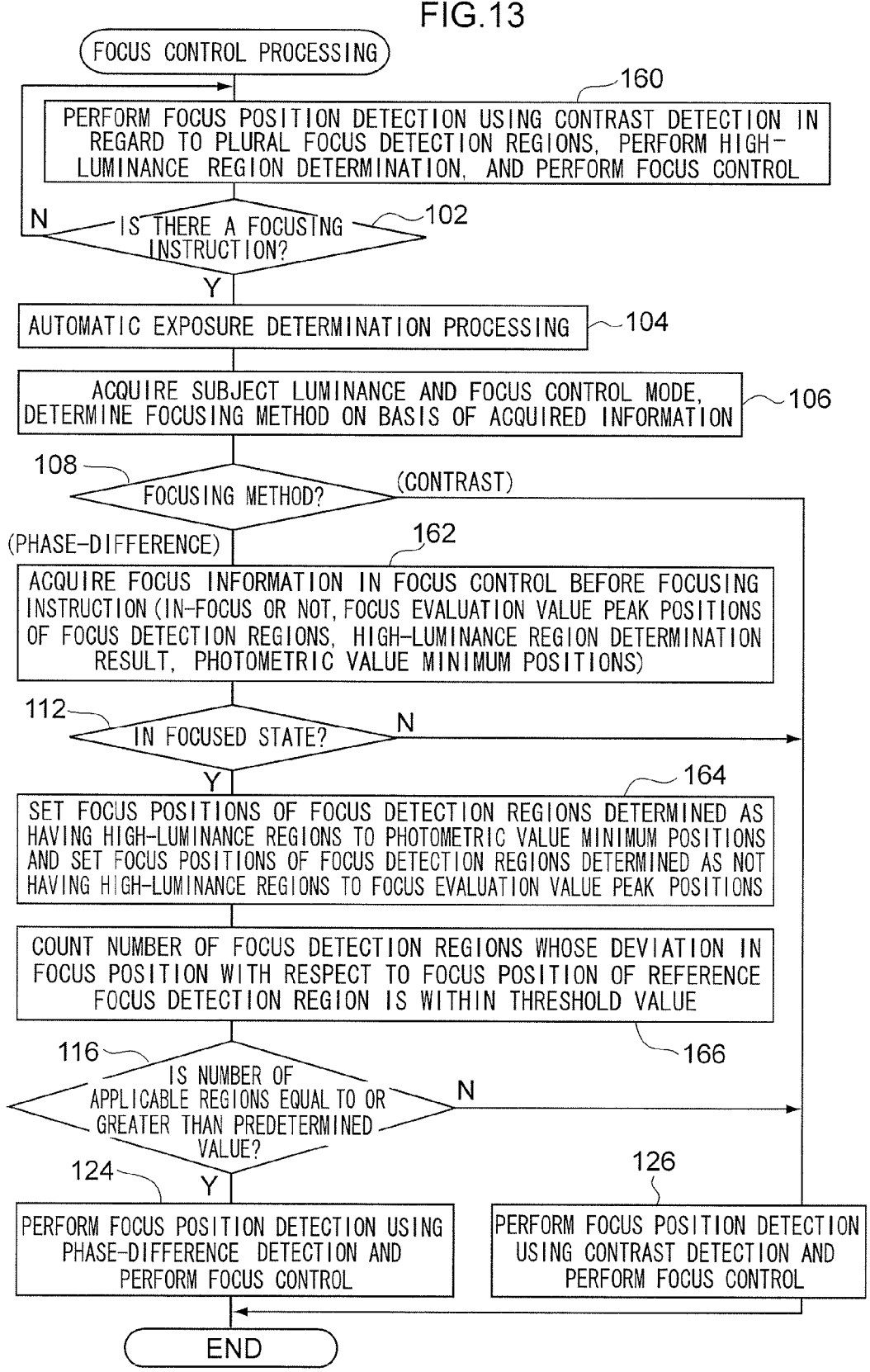

IMAGING DEVICE, METHOD FOR CONTROLLING IMAGING DEVICE, AND COMPUTER-READABLE STORAGE MEDIUM

CROSS-REFERENCE TO RELATED APPLICATIONS

This application is a continuation application of International Application No. PCT/JP2012/057944, filed Mar. 27, 2012, the disclosure of which is incorporated herein by reference in its entirety. Further, this application claims priority from Japanese Patent Application No. 2011-079582, filed Mar. 31, 2011, the disclosure of which is incorporated herein by reference in its entirety.

BACKGROUND

1. Technical Field

The present invention pertains to an imaging device and a method for controlling imaging device, and computer-readable storage medium, and particularly relates to imaging device including an imaging element in which phase-difference detection pixels are disposed in a partial region within a light-receiving surface, an imaging device control method that is applicable to the imaging device, and a computer-readable storage medium storing an imaging device control program for execution by a computer disposed in the imaging device.

2. Related Art

Conventionally, phase-difference detection and contrast detection have been known as focus position detection methods in autofocus mechanisms of imaging devices. Phase-difference detection detects the amount of misalignment and the direction of a focal point position with respect to a focus position by using a dedicated sensor to detect misalignment between two images obtained by pupil division from light that has passed through an imaging lens; with phase-difference detection, the focus position can be detected in a relatively short amount of time because it is not necessary to move the focal point position of the imaging lens when detecting the focus position. On the other hand, contrast detection conducts a search for a focal point position (focus position) at which focus evaluation values relating to contrast in an image captured by an imaging element become a maximum while moving the focal point position of the imaging lens; with contrast detection, a dedicated sensor is unnecessary and focusing precision is relatively high.

Because phase-difference detection and contrast detection have different characteristics in this way, technologies that are disposed with the function of using both methods to detect the focus position and which select the method to be used for focusing have been proposed. For example, JP-A No. 2010-139942 discloses a technology where, in an imaging device including phase-difference pixels and normal pixels, the value of an evaluation function for evaluating whether or not distance measurement using phase-difference AF (autofocus) is possible is compared to a threshold value to thereby determine the reliability of phase-difference AF; when the determined reliability is high, a focus lens is driven in the direction of the focus position detected using phase-difference AF, and when the reliability of phase-difference AF is low, the focus is driven in the direction of the focus position detected using contrast AF and the focus lens is driven to the focus position resulting from contrast AF, whose precision is high in the vicinity of the focus position.

Phase-difference detection has the drawback that, compared to contrast detection, the conditions of subjects whose focus position is detectable are limited; more specifically, phase-difference detection has the problem that in a case where the distribution range, on the light-receiving surface of the imaging element, of a subject that is the focus target is large with respect to the size of the detection region for detecting phase difference (a case where the size of the subject on the light-receiving surface of the imaging element is large or where the size of the subject on the light-receiving surface of the imaging element is small but plural subjects existing at proximate distances exist in proximate positions on the light-receiving surface), the precision of focus position detection can be ensured, but in a case where the distribution range, on the light-receiving surface of the imaging element, of the subject that is the focus target is small, the precision of focus position detection drops.

With respect to this, in the technology described in JP-A No. 2010-139942 mentioned above, the value of the evaluation function for evaluating whether or not distance measurement using phase-difference AF is possible is compared to the threshold value to thereby determine the reliability of phase-difference AF. For this reason, in the technology described in JP-A No. 2010-139942, there is the potential for focus position detection to be performed using phase-difference detection also in a case where a subject not suited for focus position detection using phase-difference detection is to be captured, and in this case the precision of focus control drops as a result of being unable to detect the focus position or an erroneously detected focus position being used. Further, there also arises the problem that, in a case where focus position detection is switched to contrast detection when the focus position was unable to be detected using phase-difference detection, the amount of time from when focusing is instructed to until focusing is completed becomes longer.

SUMMARY

The present invention has been made in consideration of the above-described circumstances, and it is an object thereof to obtain an imaging device, a control method for imaging device, and a computer-readable storage medium storing an imaging device control program that can suppress a drop in the precision of focus control in a case where a subject with which the precision of focus position detection will drop if phase-difference detection is used is to be captured.

An imaging device pertaining to a first aspect of the present invention is configured to include: an imaging unit that includes an imaging element in which phase-difference detection pixels are disposed in a partial region within a light-receiving surface and captures a subject with light made incident on the light-receiving surface of the imaging element via an optical system whose focal point position is movable; a first detector which, on the basis of image signals obtained by image capture by the imaging unit, repeatedly computes, while moving the focal point position of the optical system, a focus evaluation value within a detection region set in an image expressed by the image signals and detects a focus position in the detection region from the relationship between the focal point positions and the focus evaluation values; a second detector that detects a focus position on the basis of detection signals output from the phase-difference detection pixels; an acquiring unit that causes processing that detects focus positions of plural detection regions set in the image to be repeated by the first detector and, when focusing is instructed via an instructing unit, acquires the focus positions of the plural detection regions detected immediately before by the first detector; and a controller which, when focusing is instructed via the instructing unit, selects the first detector in a case where the number of detection regions whose deviation in detected focus position with respect to a focus position detected in a reference detection region among the plural detection regions is within a preset threshold value is less than a predetermined value, selects the second detector in a case where the number of detection regions whose deviation in detected focus position is within the threshold value is equal to or greater than the predetermined value, causes focus position detection to be performed by the selected detector, and causes focus control of the optical system by a focus controller to be performed using the focus position detected by the selected detector.

A method for controlling an imaging device pertaining to a tenth aspect is a method for controlling an imaging device that includes an imaging unit that includes an imaging element in which phase-difference detection pixels are disposed in a partial region within a light-receiving surface and captures a subject with light made incident on the light-receiving surface of the imaging element via an optical system whose focal point position is movable, a first detector which, on the basis of image signals obtained by image capture by the imaging unit, repeatedly computes, while moving the focal point position of the optical system, a focus evaluation value within a detection region set in an image expressed by the image signals and detects a focus position in the detection region from the relationship between the focal point positions and the focus evaluation values, and a second detector that detects a focus position on the basis of detection signals output from the phase-difference detection pixels, wherein an acquiring unit causes processing that detects focus positions of plural detection regions set in the image to be repeated by the first detector and, when focusing is instructed via an instructing unit, acquires the focus positions of the plural detection regions detected immediately before by the first detector, and when focusing is instructed via the instructing unit, a controller causes focus position detection to be performed by a detector among the first detector and the second detector that has been selected on the basis of deviations in the focus positions of the plural detection regions acquired by the acquiring unit and causes focus control of the optical system by a focus controller to be performed using the focus position detected by the selected detector.

A computer-readable storage medium pertaining to an eleventh aspect of the present invention stores a control program that causes a computer disposed in an imaging device including an imaging unit that includes an imaging element in which phase-difference detection pixels are disposed in a partial region within a light-receiving surface and captures a subject with light made incident on the light-receiving surface of the imaging element via an optical system whose focal point position is movable, a first detector which, on the basis of image signals obtained by image capture by the imaging unit, repeatedly computes, while moving the focal point position of the optical system, a focus evaluation value within a detection region set in an image expressed by the image signals and detects a focus position in the detection region from the relationship between the focal point positions and the focus evaluation values, and a second detector that detects a focus position on the basis of a detection signals output from the phase-difference detection pixels to function as an acquiring unit that causes processing that detects focus positions of plural detection regions set in the image to be repeated by the first detector and, when focusing is instructed via an instructing unit, acquires the focus positions of the plural detection regions detected immediately before by the first detector and a controller which, when focusing is instructed via the instructing unit, causes focus position detection to be performed by a detector among the first detector and the second detector that has been selected on the basis of deviations in the focus positions of the plural detection regions acquired by the acquiring unit and causes focus control of the optical system by a focus controller to be performed using the focus position detected by the selected detector.

BRIEF DESCRIPTION OF THE DRAWINGS

Exemplary embodiments of the present invention will be described in detail based on the following figures, wherein:

FIG. 1 is a block diagram showing the schematic configuration of an imaging device described in embodiments;

FIG. 6 is an illustration showing examples of focus detection method selection results in the first embodiment;

FIG. 8A is a plan view showing a disposition of the phase-difference detection pixels in the second embodiment;

FIG. 8B is a plan view showing a disposition of focus detection regions in focus position detection before focus instruction;

FIG. 10B is a flowchart showing focus control processing pertaining to a third embodiment;

FIG. 11A is a plan view showing a disposition of the phase-difference detection pixels in the third embodiment;

FIG. 11B is a plan view showing a disposition of focus detection regions in focus position detection before focus instruction;

FIG. 13 is a flowchart showing focus control processing pertaining to a fourth embodiment.

DETAILED DESCRIPTION

Figure 2A:
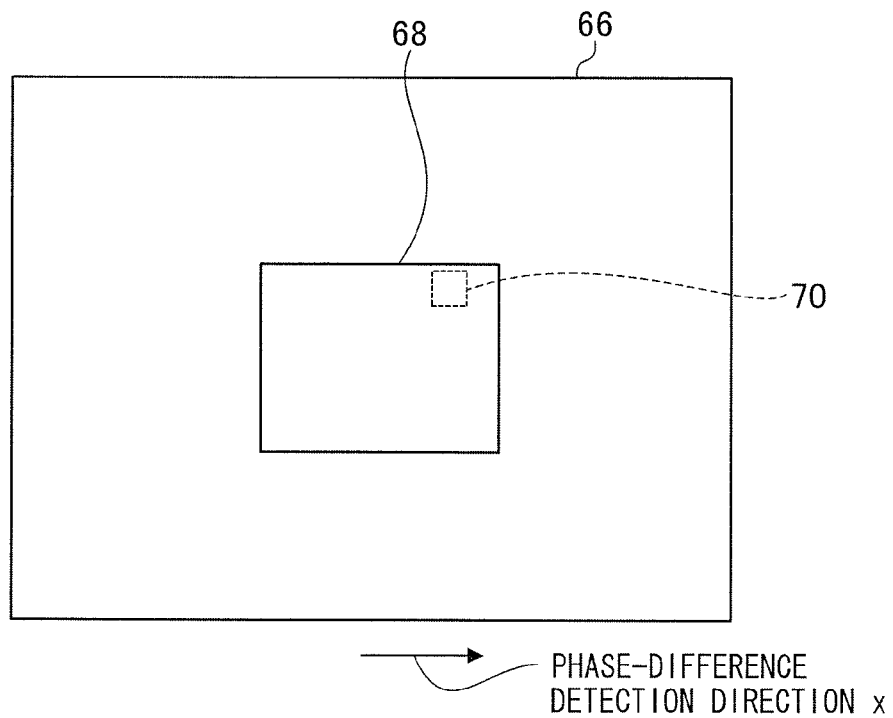
FIG. 2A is a plan view showing an example of a focus detection region, in focus position detection using phase-difference detection, of a light-receiving surface of an imaging element.

Examples of embodiments of the present invention will be described in detail below with reference to the drawings.

First Embodiment

FIG. 1 shows an imaging device 10 pertaining to the present embodiment. The imaging device 10 includes an optical unit 12 having built therein a lens group 12A whose focal point position is movable and whose focal point distance is changeable, an aperture 12B, a shutter 12C, and various types of motors (not shown in the drawings). The motors built into the optical unit 12 include a focus motor that drives the lens group 12A in such a way that the focal point position of the lens group 12A moves, a zoom motor that drives the lens group 12A in such a way that the focal point distance of the lens group 12A changes, an iris motor that drives the aperture 12B to open and close, and a shutter motor that drives the shutter 12C to open and close, and these motors are driven by an optical unit driver 14. The optical unit 12 is an example of an optical system in the present invention.

An imaging element 16 that captures images of subjects formed by the lens group 12A is disposed on the rear of the optical axis of the lens group 12A of the optical unit 12. The imaging element 16 includes a CCD sensor or a CMOS sensor, and phase-difference detection pixels are disposed in a partial region within a light-receiving surface 66 (see FIG. 2A) of the imaging element 16 (details described later). The imaging element 16 is an example of an imaging element and an imaging unit in the present invention.

Further, the imaging device 10 includes an analog signal processor 18, and an image signal output end of the imaging element 16 is connected to the analog signal processor 18. The analog signal processor 18 is configured to include an amplifier (AMP) 20 that amplifies analog image signals output from the imaging element 16, an analog-to-digital converter (ADC) 22 that converts the analog image signals amplified by the amplifier 20 into digital image data, and a timing generator (TG) 24 that generates a timing signal for driving the imaging element 16 and supplies the timing signal to the imaging element 16.

Further, the imaging device 10 includes a digital signal processor 26, and a signal output end of the ADC 22 is connected to the digital signal processor 26. The digital signal processor 26 is configured to include an image buffer 28 that holds the image data output from the ADC 22, a timer 30, a color processor 32 that performs various types of color processing with respect to the image data, a compressor/decompressor 34 that performs compression and decompression with respect to the image data, a media interface (I/F) 38 that controls access with respect to nonvolatile portable recording media 36, an exposure detector 40 that performs exposure and white balance detection, a contrast AF detector 42 that performs focus position detection using contrast detection, a phase-difference AF detector 44 that performs focus position detection using phase-difference detection, a CPU 46 that controls the operations of the entire imaging device 10, a memory 48, a flash ROM 50 in which a focus control program for the CPU 46 to perform later-described focus control processing is stored beforehand, and a display interface (I/F) 54 that displays captured images and menu screens on an LCD (liquid crystal display) 52 disposed in the imaging device 10.

The contrast AF detector 42 is an example of a first detector of the present invention, and the phase-difference AF detector 44 is an example of a second detector of the present invention.

Further, the focus control program is an example of an imaging device control program pertaining to the present invention.

The image buffer 28, the timer 30, the color processor 32, the compressor/decompressor 34, the exposure detector 40, the contrast AF detector 42, the phase-difference AF detector 44, the CPU 46, the memory 48, the flash ROM 50, and the display I/F 54 are connected to each other via a system bus 56, and the media I/F 38 is connected to the compressor/decompressor 34.

Moreover, an operation unit 58 and a release switch (so-called shutter switch) 60 that detects a shutter button pressing operation when performing image capture are disposed in the imaging device 10. Although it is not shown in the drawings, the operation unit 58 is configured to include various types of switches, such as a power switch that is operated when switching the power of the imaging device 10 on and off, a mode switching switch that is operated when switching operating modes of the imaging device 10 (e.g., an image capture mode that is selected at the time of image capture, a playback mode that is selected when playing back and displaying captured images on the LCD 52, etc.), a menu switch that is pressingly operated when displaying menu screens on the LCD 52, an enter switch that is pressingly operated when deciding operation content up until then, and a cancel switch that is pressingly operated when canceling operation content immediately before. The operation unit 58 and the release switch 60 are connected to the CPU 46.

The release switch 60 is configured to be capable of detecting a two-stage pressing operation: a state in which the shutter button has been depressed to an intermediate position (a half-pressed state) and a state in which the shutter button has been depressed to a final depressed position beyond the intermediate position (a fully pressed state). In the imaging device 10, when the half-pressed state of the shutter button is detected by the release switch 60, an AE (Automatic Exposure) function operates and the state of exposure (shutter speed and aperture value) is set, thereafter an AF function works and focus control is performed, and thereafter when the shutter button is moved to the fully pressed state, exposure (image capture) is performed.

Further, an electronic flash 62 for emitting light applied to subjects as needed at the time of image capture is disposed in the imaging device 10. The electronic flash 62, the optical unit driver 14, and the TG 24 are connected to the CPU 46, and the operations of these components are controlled by the CPU 46.

Pixels in which photoelectric conversion elements (in the present embodiment, photodiodes) are disposed are arrayed in a square grid on the light-receiving surface 66 (see FIG. 2A) of the imaging element 16. The array of the pixels is not limited to being a square grid and may also, for example, be a so-called honeycomb pixel array in which even numbers of rows (even numbers of columns) of pixel rows (pixel columns) are arrayed in such a way as to be offset at a pitch of ½ pixel each with respect to odd numbers of rows (odd numbers of columns) of pixel rows (pixel columns). As shown in FIG. 2A, in the imaging element 16, a rectangular phase-difference detection region 68 is disposed in part of the light-receiving surface 66—in the present embodiment, in the substantial center portion of the light-receiving surface 66. Normal pixels (pixels for image capture) and phase-difference detection pixels (pixels that output detection signals for performing focus position detection using phase-difference detection) are periodically arrayed within the phase-difference detection region 68. Only the normal pixels (pixels for image capture) are arrayed in the region of the light-receiving surface 66 outside the phase-difference detection region 68.

Figure 3:
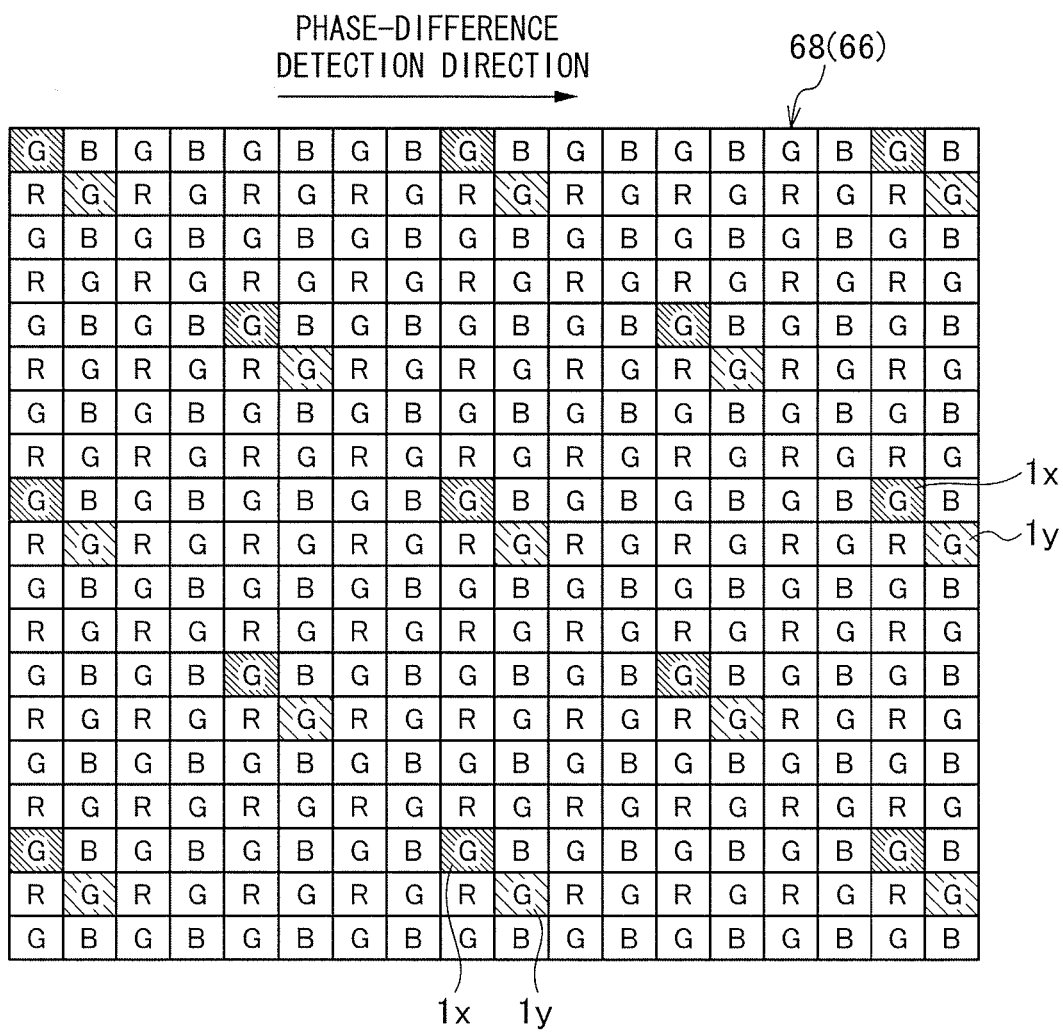
FIG. 3 is a plan view showing an example of a disposition of normal pixels and phase-difference detection pixels on the light-receiving surface of the imaging element.
Figure 4A:
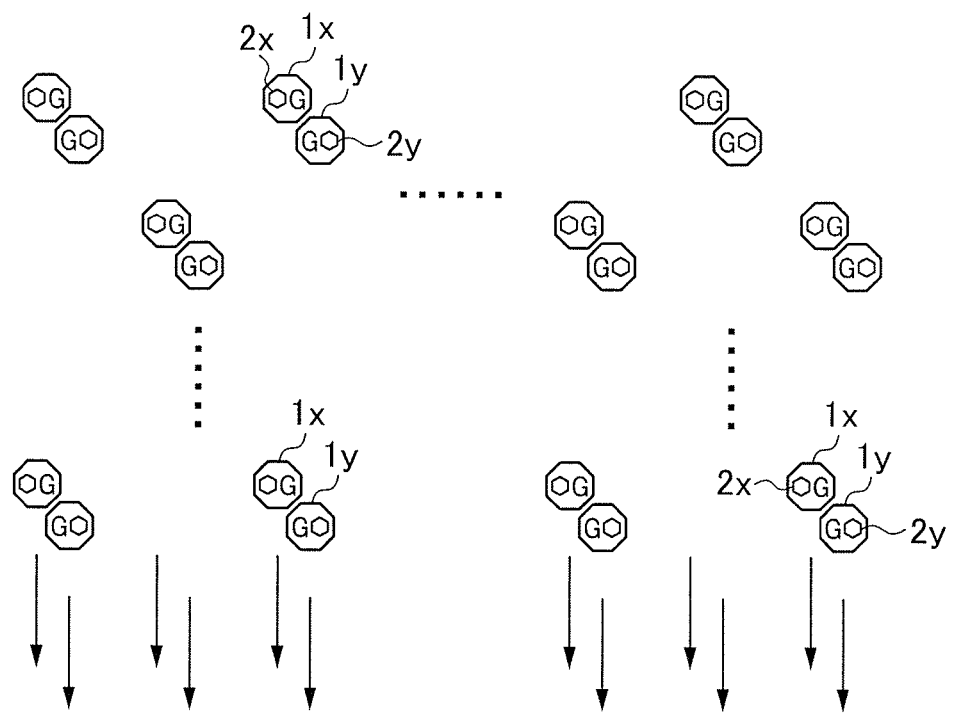
FIG. 4A is a schematic view showing the phase-difference detection pixels.

FIG. 3 is an enlarged view of the section denoted by dashed line rectangular frame 70 within the phase-difference detection region 68 in FIG. 2A. In FIG. 3, reference signs "R (red)", "G (green)", and "B (blue)" representing the colors of color filters layered on the pixels are added to the individual pixels (the normal pixels and the phase-difference detection pixels), and hatching is further added to the phase-difference detection pixels. The color filters are arranged in a Bayer array in this example, but the color filters are not limited to being arranged in a Bayer array and may also be arranged in another color filter array such as stripes. In FIG. 3, pairs of the phase-difference detection pixels are formed by two phase-difference detection pixels 1x and 1y that are most adjacent (most proximate) to each other in a diagonal direction. Further, of the phase-difference detection pixel pairs forming the pairs, a light-blocking film opening (the outlined section) 2x is shifted to the left side in the phase-difference detection pixels 1x positioned on the left side in FIG. 4A, and a light-blocking film (the outlined section) 2y is shifted to the opposite side (the right side) in the phase-difference detection pixels 1y positioned on the right side in FIG. 4A. In order to avoid confusion in the drawing, FIG. 4A shows only the phase-difference detection pixels.

Figure 4B:
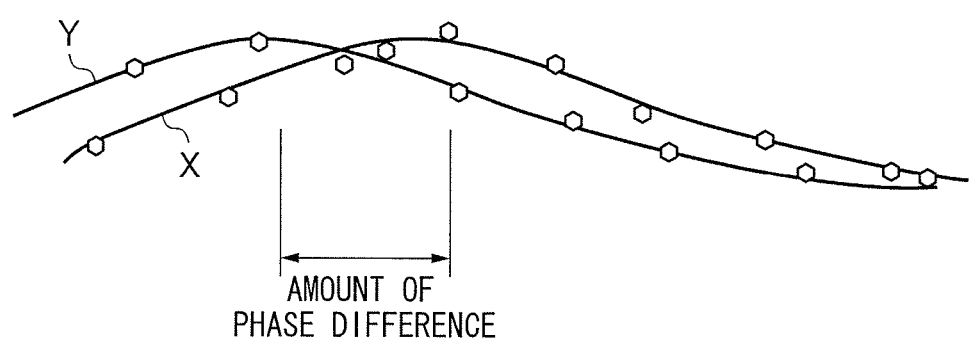
FIG. 4B is a diagram showing an example of detection signals of phase-difference detection pixel pairs.

Focus position detection using phase-difference detection by the phase-difference AF detector 44 using the detection signals output from the phase-difference detection pixels will be described below. Of the phase-difference detection pixels 1x and 1y, the distribution of the detection signals of the phase-difference detection pixels 1x whose light-blocking film openings 2x are shifted to the left side takes characteristic X shown in FIG. 4B, and the distribution of the detection signals of the phase-difference detection pixels 1y whose light-blocking film openings 2y are shifted to the right side takes characteristic Y shown in FIG. 4B. The phase-difference detection pixels 1x and 1y can be thought of as receiving light from the same subjects because they are adjacent to each other on the light-receiving film 66 and the distance between them is extremely small. For this reason, characteristic X and characteristic Y can be thought of as becoming the same shape, and the left-and-right direction (phase-difference detection direction) misalignment between characteristic X and characteristic Y becomes the amount of phase difference between the image seen from the phase-difference detection pixels 1x that are one of the pupil-divided phase-difference detection pixel pairs and the image seen from the phase-difference detection pixels 1y that are the other of the pupil-divided phase-difference detection pixel pairs.

Consequently, by performing correlation computation of characteristic X and characteristic Y, the amount of phase difference (the amount of misalignment of the current focal point position with respect to the focus position) can be found. As the method of finding the evaluation value of the amount of correlation between characteristic X and characteristic Y, for example, the method described in JP-A No. 2010-8443 and the method described in JP-A No. 2010-91991 can be applied; specifically, the integrated values of the absolute values of the differences between each point x(i) on characteristic X and each point y(i+j) on characteristic Y are taken as focus evaluation values, and the value of j at which the focus evaluation value becomes a minimum can be detected as the amount of phase difference (the amount of misalignment of the current focal point position with respect to the focus position).

As the light-receiving area per pixel becomes smaller, the levels of the detection signals of the individual phase-difference detection pixels become smaller and the percentage of noise increases, so even if correlation computation is performed, it becomes difficult to detect the amount of phase difference with good precision. For this reason, within the phase-difference detection region 68 of FIG. 2A, it is preferred that plural pixels' worth of the detection signals of the phase-difference detection pixels 1x whose positions along the phase-difference detection direction are the same be added together in the direction perpendicular to the phase-difference detection direction and that plural pixels' worth of the detection signals of the phase-difference detection pixels 1y whose positions along the phase-difference detection direction are the same be added together in the direction perpendicular to the phase-difference detection direction. Because of this, the effect of noise is reduced and it becomes possible to improve the precision (AF precision) of focus position detection in phase-difference detection.

Figure 5:
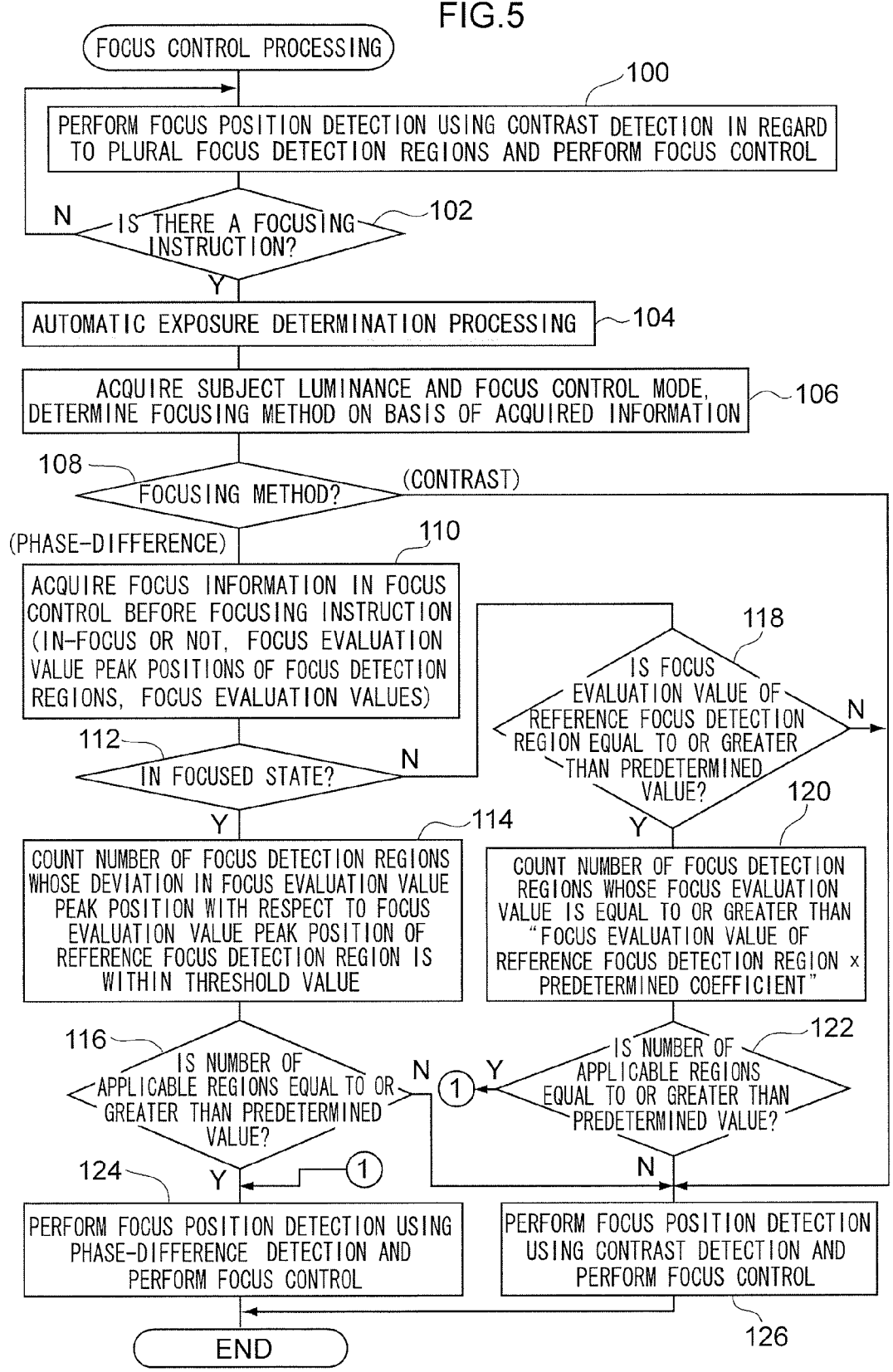
FIG. 5 is a flowchart showing focus control processing pertaining to a first embodiment.

Next, focus control processing, which is performed as a result of the focus control program stored beforehand in the memory 48 being executed by the CPU 46 while the image capture mode is set as the operating mode of the imaging device 10, will be described with reference to FIG. 5 as the action of the present first embodiment.

Figure 2B:
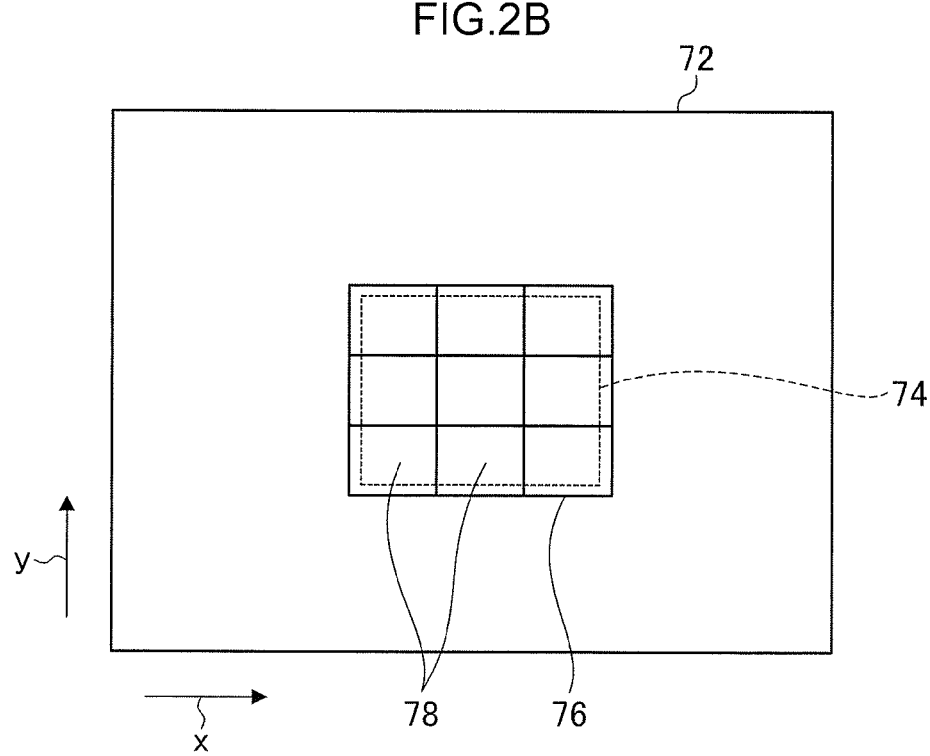
FIG. 2B is a plan view showing an example of a focus detection region, in focus position detection using contrast detection before focus instruction, of the light-receiving surface of the imaging element.

In the focus control processing, first, in step 100, the CPU 46 causes the focus position to be detected before focusing instruction using contrast detection by the contrast AF detector 42 and performs focus control (also called continuous AF) before focusing instruction on the basis of the focus position detected by the contrast AF detector 42. In the present embodiment, the detection region in focus position detection before focusing instruction is, as shown in FIG. 2B, set to a region 76 that contains a region 74—of an image 72 captured by the imaging element 16—corresponding to the phase-difference detection region 68 and is slightly larger than the region 74, and the detection region 76 is divided into plural detection regions 78 in a phase-difference detection direction (x direction) resulting from the phase-difference AF detector 44 and a direction (y direction) orthogonal to the phase-difference detection direction. For example, in the example in FIG. 2B, the detection region 76 is divided into three detection regions 78 in the x direction and three detection regions 78 also in the y direction for a total of nine detection regions 78.

For this reason, the focus position detection before focusing instruction by the contrast AF detector 42 is performed as follows, for example. That is, the CPU 46 causes the focus motor built into the optical unit 12 to be driven in steps by the optical unit driver 14 in such a way that the focal point position of the lens group 12A of the optical unit 12 moves a predetermined amount at a time. Further, in parallel with this processing, the CPU 46 causes image capture by the imaging element 16 to be performed each time the focal point position of the lens group 12A moves the predetermined amount, extracts and integrates the high-frequency components for each of the individual detection regions 78 from luminance information (an example of image signals pertaining to a first aspect) of the image captured by the imaging element 16, computes focus evaluation values (e.g., contrast evaluation values), correlates the computed focus evaluation values of each of the individual detection regions 78 with information (e.g., the pulse numbers of pulse signals supplied to the focus motor and the step positions of the focus motor found from the direction in which the focus motor is driven) corresponding to the focal point positions of the lens group 12A, and stores these in the memory 48 or the like.

Moreover, the CPU 46 monitors changes, accompanying the movement of the focal point position of the lens group 12A, in the focus evaluation value of a reference detection region 78 (for example, a detection region 78 positioned in the center, or the vicinity of the center, of the detection region 76) preset among the plural detection regions 78, and in a case where the CPU 46 has detected a change in which the focus evaluation value of the reference detection region 78 drops to a predetermined amount (or a predetermined percentage) after having reached a peak (a maximum value), the CPU 46 outputs, as the focus position, information (the step position of the focus motor) corresponding to the focal point position of the lens group 12A when the focus evaluation value of the reference detection region 78 is at a peak. In the present embodiment, in focus position detection before focusing instruction by the contrast AF detector 42, the focal point positions (the step positions of the focus motor) of the lens group 12A when the focus evaluation values of the individual detection regions 78 are at peaks are detected also in regard to the other detection regions 78 outside the reference detection region 78.

When the focus position is detected by the contrast AF detector 42 as described above, the CPU 46 performs focus control that moves the focal point position of the lens group 12A of the optical unit 12 to the detected focus position by causing the focus motor built into the optical unit 12 to be driven by the optical unit driver 14 in accordance with the detected focus position.

Further, in the next step 102, the CPU 46 determines whether or not focusing with respect to a subject has been instructed on the basis of whether or not the half-pressed state of the shutter button has been detected by the release switch 60. In a case where the determination is NO, the CPU 46 returns to step 100 and repeats steps 100 and 102 until the determination in step 102 becomes YES. Consequently, while the imaging device 10 is operating in the image capture mode, the focus position detection and the focus control in step 100 are repeatedly executed until the determination in step 102 becomes YES as a result of the half-pressed state of the shutter button being detected by the release switch 60.

The focus position detection by the contrast AF detector 42 during the period while the determination in step 102 is NO may be performed in a fixed time cycle or in such a way that the computation of the focus evaluation value of the reference detection region 78 is repeated by the contrast AF detector 42 and redetection of the focus position is performed in a case where the focus evaluation value has dropped a predetermined value or more or has dropped a predetermined percentage or more. Further, during the period while the determination in step 102 is NO, the image captured by the imaging element 16 is displayed on the LCD 52 as a through image, but the imaging device 10 is not limited to this and may also be configured to not display a through image on the LCD 52 in a case where an optical viewfinder is disposed in the imaging device 10.

Further, when the half-pressed state of the shutter button is detected by the release switch 60, the determination in step 102 becomes YES and the CPU 46 moves to step 104 and causes automatic exposure determination processing that determines exposure and white balance to be performed by the exposure detector 40. In the next step 106, the CPU 46 acquires the subject luminance in the image captured by the imaging element 16 and preset focus control mode information and determines on the basis of the acquired information which of contrast detection and phase-difference detection is the suitable focus position detection method.

For example, phase-difference detection has the characteristic that the precision of focus position detection drops in a case where the subject luminance is relatively low, so in a case where the acquired subject luminance is equal to or less than a preset threshold value, contrast detection is determined as being the suitable focus position detection method. Further, the focus control mode is for allowing the user to be able to switch the setting of the focus position detection region, and a "center fixing mode" that fixes the focus position detection region in the center portion of the image and an "auto mode" that automatically moves the position of the focus position detection region in accordance with a subject serving as the target of image capture are disposed. In the present embodiment, the phase-difference detection region 68 is disposed in the substantial center portion within the light-receiving surface 66 of the imaging element 16, so in a case where, for example, the focus control mode is the "center fixing mode", phase-difference detection is determined as being the suitable focus position detection method, and in a case where the focus control mode is a mode other than the "center fixing mode", contrast detection is determined as being the suitable focus position detection method.

In the next step 108, the CPU 46 determines whether the focus position detection method determined in step 106 is contrast detection or phase-difference detection and branches off in accordance with the determination result. In a case where the focus position detection method determined in step 106 is contrast detection, the CPU 46 moves from step 108 to step 126, causes the focus position to be detected using contrast detection by the contrast AF detector 42, and performs focus control on the basis of the focus position detected by the contrast AF detector 42. In the focus position detection in step 126, in contrast to focus position detection before focusing instruction described above, focus evaluation value (contrast evaluation value) computation and focus position detection are performed by the contrast AF detector 42 taking as a target a small area (e.g., an area of about 10%×10% of the total angle of view) of the center of the image 72 captured by the imaging element 16, for example.

On the other hand, in a case where the focus position detection method determined in step 106 is phase-difference detection, the CPU 46 moves from step 108 to step 110 and acquires, from the contrast AF detector 42 as focus information obtained by the focus position detection before focusing instruction by the contrast AF detector 42, information indicating whether or not the lens group 12A of the optical unit 12 is currently in a focused state, information (focus evaluation value peak positions) indicating the focal point positions (the step positions of the focus motor) of the lens group 12A when the focus evaluation value is at a peak for each of the individual detection regions 78, and the focus evaluation values of each of the individual detection regions 78 in the current state of the lens group 12A. This step 110 is an example of processing by an acquiring unit pertaining to the present invention (more specifically, an acquiring unit of an eighth aspect) together with earlier step 100 of causing focus position detection before focusing instruction to be performed by the contrast AF detector 42.

In the next step 112, the CPU 46 determines whether or not the lens group 12A of the optical unit 12 is currently in a focused state on the basis of the focus information acquired in step 110. In a case where the determination in step 112 is YES, the relationship between the focal point position of the lens group 12A and the focus evaluation values of each of the individual detection regions 78 is detected by the contrast AF detector 42 with respect to the subject on which the lens group 12A is currently focused, so the focus evaluation value peak positions of each of the individual detection regions 78 acquired from the contrast AF detector 42 in step 110 can be judged as having high reliability.

For this reason, in a case where the determination in step 112 is YES, the CPU 46 moves to step 114, calculates the deviations from the focus evaluation value peak position of the reference detection region 78 in regard to the focus evaluation value peak positions of the individual detection regions 78 outside the reference detection region 78, and determines whether or not the calculated deviations are within a preset threshold value, whereby the CPU 46 counts the number of detection regions 78 whose deviation in focus evaluation value peak position from that of the reference detection region 78 is within the threshold value. For example, in a case where the focus evaluation value peak positions are expressed by the step positions of the focus motor, the deviations in focus evaluation value peak position are expressed by the pulse numbers of the drive signals supplied to the focus motor, and the determination of whether or not the deviations in focus evaluation value peak position are within the threshold value is performed by determining whether or not the pulse numbers expressing the deviations in focus evaluation value peak position are equal to or greater than a predetermined value.

In the next step 116, the CPU 46 determines whether or not the number of detection regions 78 counted in step 114 (the number of detection regions 78 whose deviation in focus evaluation value peak position from that of the reference detection region 78 is within the threshold value) is equal to or greater than a predetermined value. As the predetermined value in the determination in step 116, a value for determining whether or not a number obtained by adding 1 (the number of the reference detection region 78) to the number of detection regions 78 whose deviation in focus evaluation value peak position from that of the reference detection region 78 is within the threshold value will reach the majority of the total number of detection regions 78 can be used, but a value greater than this may also be used.

In a case where the determination in step 116 is NO, as shown in FIG. 6(1) as an example, it can be judged that the precision of focus position detection will be low if phase-difference detection is used because, among the individual detection regions 78 outside the reference detection region 78, the number of detection regions 78 to which subjects that are the same as that of the reference detection region 78 correspond or to which subjects existing at distances close to that of the subject corresponding to the reference detection region 78 correspond is small and the size of the main subject on the image is relatively small. For this reason, in a case where the determination in step 116 is NO, the CPU 46 moves to step 126, causes focus position detection to be performed using contrast detection by the contrast AF detector 42, and performs focus control on the basis of the focus position detected by the contrast AF detector 42.

On the other hand, in a case where the determination in step 16 is YES, as shown in FIG. 6(2) as an example, it can be judged that, among the individual detection regions 78 outside the reference detection region 78, the number of detection regions 78 to which subjects that are the same as that of the reference detection region 78 correspond is relatively high because the size of the main subject on the image is relatively large, or, as shown in FIG. 6(3) as an example, it can be judged that the number of detection regions 78 to which subjects existing at distances close to that of the subject corresponding to the reference detection region 78 correspond is relatively high because plural subjects exist at distances close to each other and the distribution range on the image of the subjects existing at distances close to each other is wide.

In cases such as those described above, the focus position can be detected with good precision using phase-difference detection, so in a case where the determination in step 116 is YES, the CPU 46 moves to step 124 and causes focus position detection to be performed by the phase-difference AF detector 44. Because of this, the phase-difference AF detector 44 performs focus position detection (more specifically, detection of the amount of misalignment of the current focal point position of the lens group 12A of the optical unit 12 with respect to the focus position) using phase-difference detection by performing the aforementioned correlation computation on the basis of the detection signals output from the phase-difference detection pixels disposed in the imaging element 16. Then, when the focus position is detected by the phase-difference AF detector 44, the CPU 46 performs focus control on the basis of the detected focus position.

In this way, on the basis of the focus information obtained by focus position detection before focusing instruction, the CPU 46 judges whether or not the subject on which the lens group 12A of the optical unit 12 is focusing is a subject with which the precision of focus position detection will drop if phase-difference detection is used, detects the focus position using contrast detection in a case where the precision of focus position detection will drop if phase-difference detection is used, and detects the focus position using phase-difference detection in a case where the focus position can be detected with good precision using phase-difference detection, so in a case where a subject with which the precision of focus position detection will drop if phase-difference detection is used is to be captured, situations where the precision of focus control drops or the amount of time from when focusing is instructed to until focusing is completed becomes long can be avoided.

Further, in a case where the lens group 12A of the optical group 12 was not in a focused state in the determination in earlier step 112, the CPU 46 can judge that the focus evaluation value peak positions of the individual detection regions 78 acquired in step 110 have low reliability, so in a case where the determination in step 112 is NO, the CPU 46 moves to step 118 and determines whether or not the focus evaluation value of the reference detection region 78 in the current state of the lens group 12A included in the focus information acquired in step 110 is equal to or greater than a predetermined value.

As for this determination, the CPU 46 determines whether or not the current state of the lens group 12A of the optical unit 12 is close to a focused state, and in a case where the determination in step 118 is YES, the CPU 46 can judge that the focus evaluation values of the individual detection regions 78 in the current state of the lens group 12A included in the focus information acquired in step 110 have a certain correlation with the distances of the subjects corresponding to the individual detection regions 78. For this reason, in a case where the determination in step 118 is YES, the CPU 46 moves to step 120 and determines whether or not the focus evaluation values of the individual detection regions 78 outside the reference detection region 78 are equal to or greater than a reference value obtained by multiplying the focus evaluation value of the reference detection region 78 by a predetermined coefficient (a value less than 1, such as about 0.8 for example), whereby the CPU 46 counts the number of the detection regions whose focus evaluation value is equal to or greater than the reference value. Then, in step 122, the CPU 46 determines whether or not the number of detection regions 78 counted in step 120 (the number of detection regions 78 whose focus evaluation value is equal to or greater than the reference value) is equal to or greater than a predetermined value.

In a case where the determination in step 122 is NO, like in the aforementioned case where the determination in step 116 is NO, it can be inferred that the precision of focus position detection will be low if phase-difference detection is used because the size of the main subject on the image is relatively small, so in a case where the determination in step 122 is NO, the CPU 46 moves to step 126, causes focus position detection to be performed using contrast detection by the contrast AF detector 42, and performs focus control on the basis of the focus position detected by the contrast AF detector 42.

Further, in a case where the determination in step 122 is YES, like in the aforementioned case where the determination in step 116 is YES, it can be inferred that the focus position can be detected with good precision using phase-difference detection because the size of the main subject on the image is relatively large or the distribution range on the image of subjects existing at distances close to each other is wide. For this reason, in a case where the determination in step 122 is YES, the CPU 46 moves to step 124, causes focus position detection to be performed by the phase-difference AF detector 44, and performs focus control on the basis of the focus position detected by the phase-difference AF detector 44.

Further, in a case where the determination in earlier step 118 is NO, it can be judged that the current state of the lens group 12A of the optical unit 12 is relatively largely distant from a focused state and that the focus evaluation values of the individual detection regions 78 have a low correlation with the distances of the subjects corresponding to the individual detection regions 78. Consequently, the CPU 46 moves to step 126, causes focus position detection using contrast detection by the contrast AF detector 42, and performs focus control on the basis of the focus position detected by the contrast AF detector 42.

In the focus control processing described above, steps 112 to 116 and 118 to 126 are an example of processing by a controller of the present invention; more specifically, steps 114 and 116 are an example of processing by a controller according to a first aspect and steps 112 and 118 to 122 are an example of processing by a controller according to an eighth aspect.

In step 118 to step 122 of the focus control processing described above, the CPU 46 uses the focus evaluation values of the detection regions 78 in place of the focus evaluation value peak positions of the detection regions 78 because the reliability of the focus evaluation value peak positions of the detection regions 78 is low and judges whether or not the subject is a subject with which the precision of focus position detection will drop if phase-difference detection is used. Thus, compared to steps 114 and 116, which use the focus evaluation value peak positions of the detection regions, the precision of the judgment of whether or not the subject is a subject with which the precision of focus position detection will drop if phase-difference detection is used is low. For this reason, in a case where the determination in step 112 is NO as a result of the lens group 12A of the optical 12 not being in a focused state, the CPU 46 may also be configured to move to step 126 without performing step 118 to step 122, cause focus position detection to be performed using contrast detection by the contrast AF detector 42, and perform focus control on the basis of the focus position detected by the contrast AF detector 42.

Second Embodiment

Figure 7A:
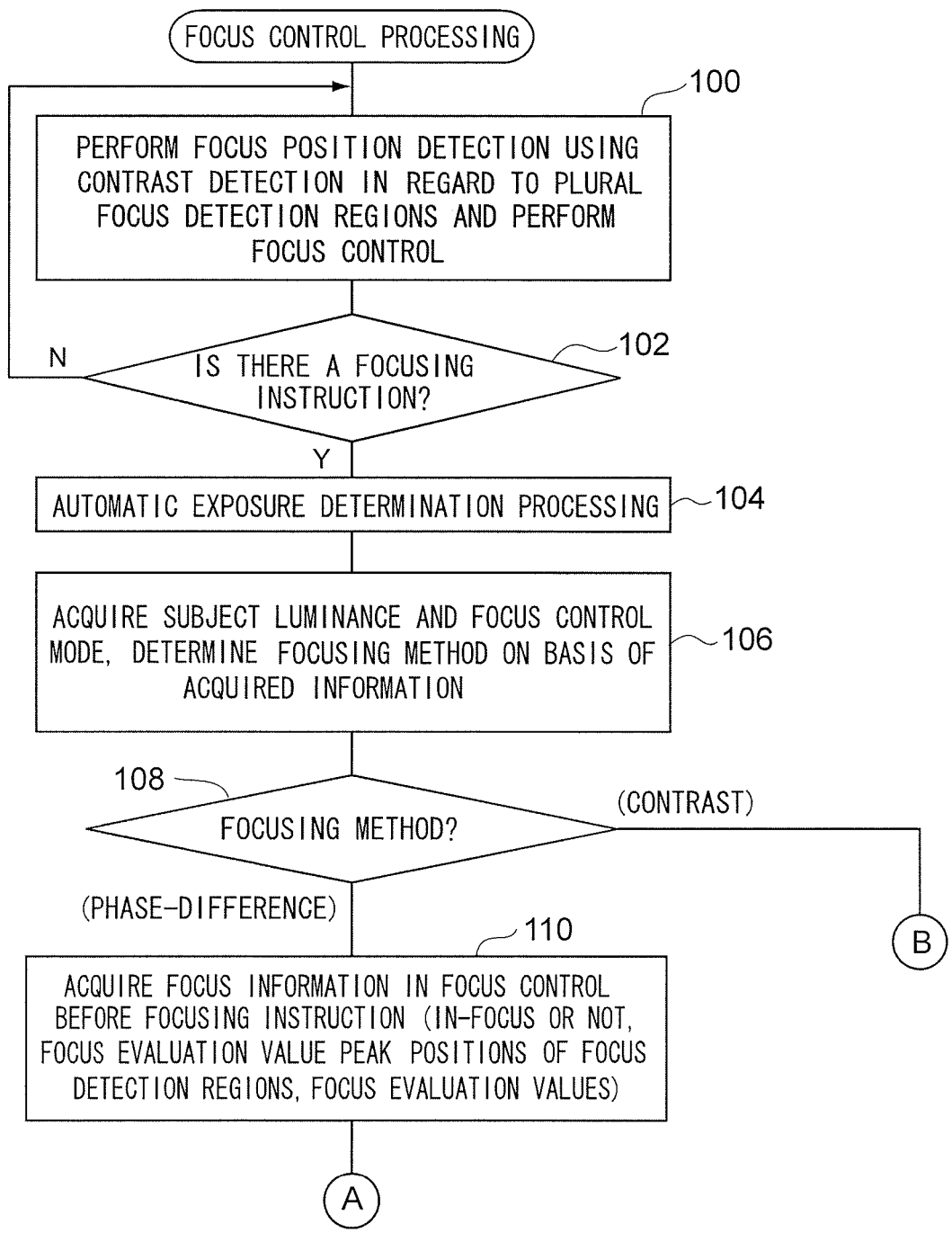
FIG. 7A is a flowchart showing focus control processing pertaining to a second embodiment.
Figure 7B:
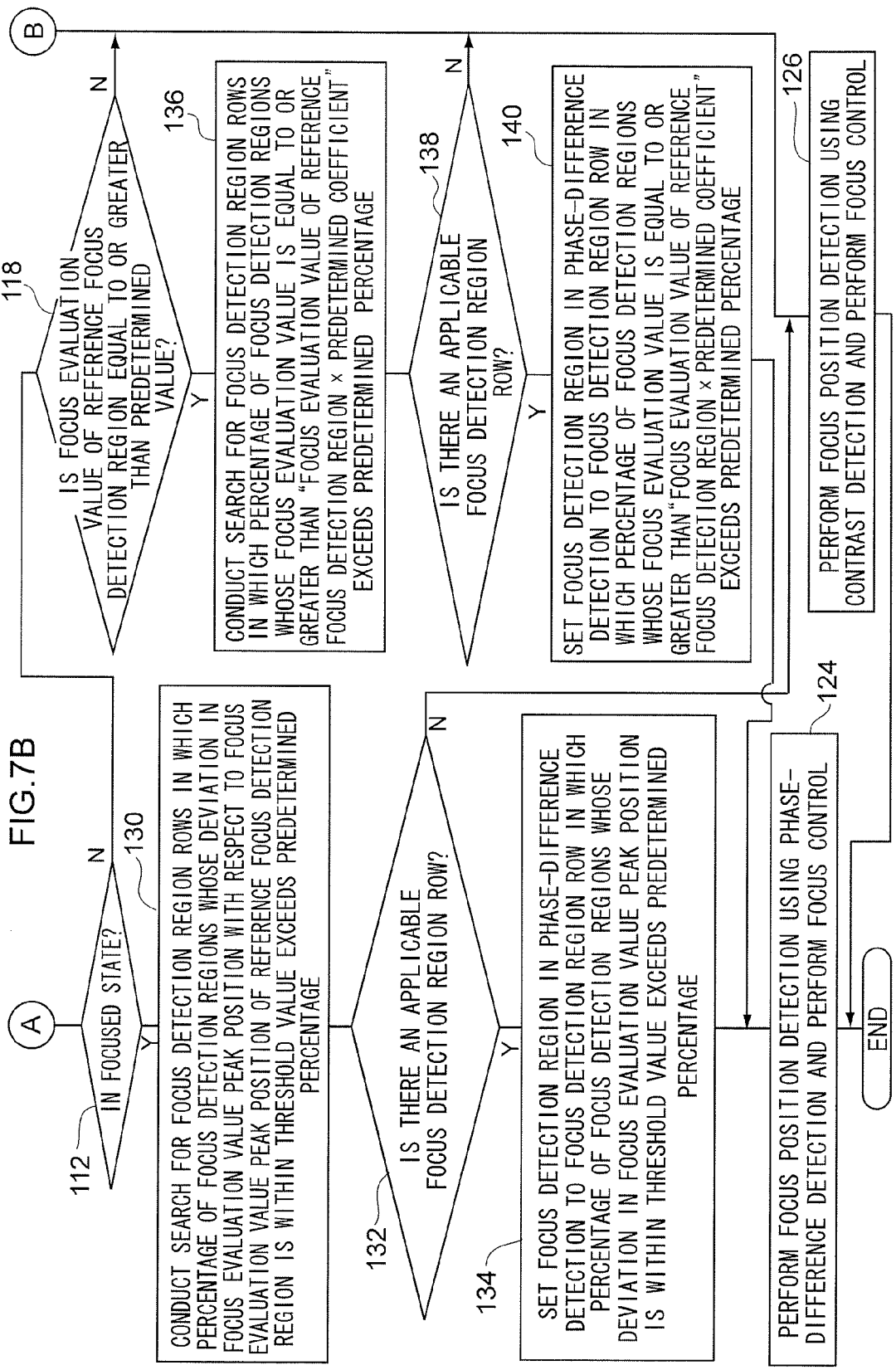
FIG. 7B is a flowchart showing focus control processing pertaining to a second embodiment.

Next, a second embodiment of the present invention will be described. The present second embodiment has the same configuration as that of the first embodiment, so the same reference signs will be given to each section, and description of configurations thereof will be omitted, and in regard to the focus control processing pertaining to the present second embodiment, only the sections differing from the focus control processing described in the first embodiment (FIG. 5) will be described below with reference to FIG. 7A, B.

In the focus control processing pertaining to the present second embodiment, the CPU 46 moves to step 130 in a case where the determination in step 112 is YES as a result of the lens group 12A of the optical unit 12 being in a focused state; first, the CPU 46 calculates the deviations from the focus evaluation value peak position of the reference detection region 78 in regard to the focus evaluation value peak positions of the individual detection regions 78 outside the reference detection region 78 and determines whether or not the calculated deviations are within a preset threshold value. Then, the CPU 46 conducts a search for whether or not, among plural detection region rows 82 each configured by plural detection regions 78 lined up along the x direction that is the phase-difference detection direction (see FIG. 8B; in the example described in the present embodiment, 3×3=9 detection regions 78 are disposed, so there exist three detection region rows 82 each configured by three detection regions 78 lined up along the x direction), there is a detection region row 82 in which the percentage of detection regions 78 whose deviation in focus evaluation value peak position from that of the reference detection region 78 is within the threshold value exceeds a predetermined percentage (e.g., 50%).

In the next step 132, the CPU 46 determines whether or not an applicable detection region row 82 was discovered in the search in step 130. In a case where the determination in step 132 is NO, the CPU 46 moves to step 126, causes focus position detection to be performed using contrast detection by the contrast AF detector 42, and performs focus control on the basis of the focus position detected by the contrast AF detector 42.

On the other hand, in a case where the determination in step 132 is YES, the CPU 46 moves to step 134 and sets, as a region on the light-receiving surface 66 to be used in focus position detection using phase-difference detection, the detection region row 82 discovered in step 130—that is, a range on the light-receiving surface 66 corresponding to the detection region row 82 in which the percentage of detection regions 78 whose deviation in focus evaluation value peak position from that of the reference detection region 78 is within the threshold value exceeds the predetermined percentage. Then, in the next step 124, the CPU 46 causes focus position detection to be performed by the phase-difference AF detector 44 on the basis of the detection signals from the phase-difference detection pixels disposed in a range on the light-receiving surface 66 of the imaging element 16 corresponding to the region set in step 134 and performs focus control on the basis of the focus position detected by the phase-difference AF detector 44.

The above processing will be described further. In focus position detection by phase-difference detection, basically, among the phase-difference detection pixels (pairs) disposed in positions within the phase-difference detection region 68 of the light-receiving surface 66, as shown in FIG. 8A, the detection of the amount of phase difference based on the detection signals from the phase-difference detection signals is performed taking, as units, phase-difference detection lines 80 including plural phase-difference detection pixels (pairs) lined up along the x direction that is the phase-difference detection direction. However, in actuality, for reasons such as wanting to reduce the effect of noise, the CPU 46 averages or adds together the detection signals of the plural phase-difference detection pixels positioned on the plural phase-difference detection lines 80 and whose positions along the phase-difference detection direction are the same, and the CPU 46 performs the detection of the amount of phase difference on the basis of the detection signals obtained through this averaging or adding together.

For this reason, in a case where the CPU 46 performs focus position detection by phase-difference detection taking the entire phase-difference detection region 68 as a target, if, for example, the shape on the light-receiving surface 66 of the main subject that is the focus target is a long and narrow shape (a shape whose size in the x direction is large and whose size in the y direction is small) along the x direction (the phase-difference detection direction), there arises the problem that, in accompaniment with the averaging or adding together of the detection signals, detection signals from phase-difference detection pixels not corresponding to the main subject end up becoming mixed together with detection signals from phase-difference detection pixels corresponding to the main subject, so that the precision of focus position detection drops.

For this reason, in the present second embodiment, the CPU 46 takes, as units, the detection region rows 82 including plural detection regions 78 lined up along the x direction (the phase-difference detection direction), determines whether or not the percentage of detection regions 78 whose deviation in focus evaluation value peak position from that of the reference detection region 78 is within the threshold value exceeds the predetermined percentage (e.g., 50%), and sets the range on the light-receiving surface 66 corresponding to the applicable detection region row 82 as the region on the light-receiving surface 66 to be used in focus position detection using phase-difference detection.

Figure 9A:
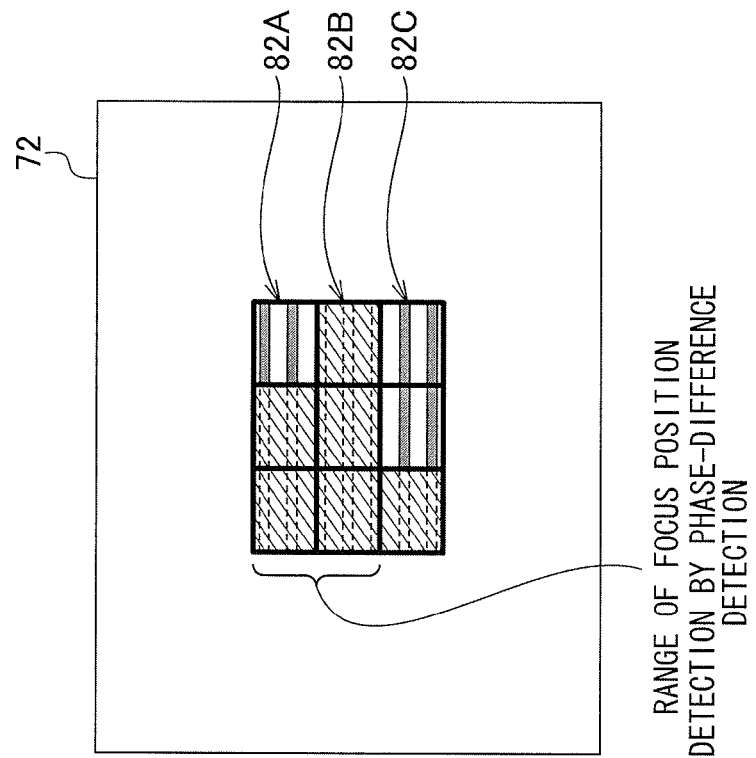
FIG. 9A is a plan view showing an example of a result of setting a focus detection region for phase-difference detection in the second embodiment.

Because of the above processing, as shown in FIG. 9A for example, in a case where the number of detection regions 78 in the first detection region row 82A whose deviation in focus evaluation value peak position is within the threshold value is 1 (a percentage of 33%), the number of detection regions 78 in the second detection region row 82B whose deviation in focus evaluation value peak position is within the threshold value is 3 (a percentage of 100%), and the number of detection regions 78 in the third detection region row 82C whose deviation in focus evaluation value peak position is within the threshold value is 0 (a percentage of 0%), the range on the light-receiving surface 66 corresponding to the second detection region row 82B is set as the region on the light-receiving surface 66 to be used in focus position detection using phase-difference detection.

Figure 9B:
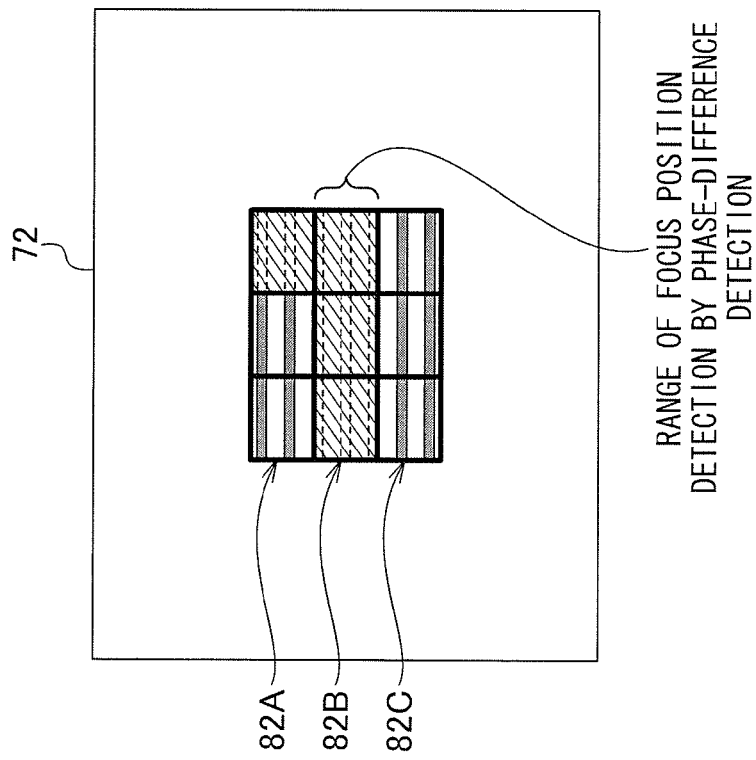
FIG. 9B is a plan view showing an example of a result of setting a focus detection region for phase-difference detection in the second embodiment.

Further, as shown in FIG. 9B for example, in a case where the number of detection regions 78 in the first detection region row 82A whose deviation in focus evaluation value peak position is within the threshold value is 2 (a percentage of 66%), the number of detection regions 78 in the second detection region row 82B whose deviation in focus evaluation value peak position is within the threshold value is 3 (a percentage of 100%), and the number of detection regions 78 in the third detection region row 82C whose deviation in focus evaluation value peak position is within the threshold value is 1 (a percentage of 33%), the range on the light-receiving surface 66 corresponding to the first and second detection region rows 82 is set as the region on the light-receiving surface 66 to be used in focus position detection using phase-difference detection.

In the above processing, focus position detection is performed using phase-difference detection using the range corresponding to the region, of the phase-difference detection region 68 on the light-receiving surface 66, in which detection regions 78 to which subjects that are the same as that of the reference detection region 78 correspond or to which subjects existing at distances close to the subject corresponding to the reference detection region 78 correspond are distributed in a percentage equal to or greater than the predetermined percentage, so the probability that detection signals from phase-difference detection pixels not corresponding to the main subject will become mixed together with detection signals from phase-difference detection pixels corresponding to the main subject during the averaging or adding together of the detection signals is reduced, whereby the precision of focus position detection by phase-difference detection can be improved compared to the first embodiment.

Further, the CPU 46 moves to step 136 in a case where the determination in step 112 is NO as a result of the lens group 12A of the optical unit 12 not being in a focused state and the determination in step 118 is YES as a result of the focus evaluation value of the reference detection region 78 in the current state of the lens group 12A being equal to or greater than the predetermined value; first, the CPU 46 determines whether or not the focus evaluation values of the individual detection regions 78 outside the reference detection region 78 are equal to or greater than a reference value obtained by multiplying the focus evaluation value of the reference detection region 78 by a predetermined coefficient (a value less than 1, such as about 0.8 for example). Then, the CPU 46 conducts a search for whether or not, among the plural detection region rows 82, there is a detection region row 82 in which the percentage of detection regions 78 whose focus evaluation value is equal to or greater than the reference value exceeds a predetermined percentage (e.g., 50%).

In a case where the determination in step 138 is NO, it can be inferred that the precision of focus position detection will be low if phase-difference detection is used, so the CPU 46 moves to step 126, causes focus position detection to be performed using contrast detection by the contrast AF detector 42, and performs focus control on the basis of the focus position detected by the contrast AF detector 42.

Further, in a case where the determination in step 138 is YES, the CPU 46 moves to step 140 and sets, as a region on the light-receiving surface 66 to be used in focus position detection using phase-difference detection, the detection region row 82 discovered in step 136—that is, a range on the light-receiving surface 66 corresponding to the detection region row 82 in which the percentage of detection regions 78 whose focus evaluation value is equal to or greater than the reference value exceeds the predetermined percentage. Then, the CPU 46 moves to step 124, causes focus position detection to be performed by the phase-difference AF detector 44 on the basis of the detection signals from the phase-difference detection pixels disposed in the range on the light-receiving surface 66 of the imaging element 16 corresponding to the region set in step 140, and performs focus control on the basis of the focus position detected by the phase-difference AF detector 44.

In regard to the above processing also, focus position detection is performed using phase-difference detection using the range corresponding to the region, of the phase-difference detection region 68 on the light-receiving surface 66, in which detection regions 78 inferred as being detection regions to which subjects that are the same as that of the reference detection region 78 correspond or to which subjects existing at distances close to the subject corresponding to the reference detection region 78 correspond are distributed in a percentage equal to or greater than the predetermined percentage, so the probability that detection signals from phase-difference detection pixels not corresponding to the main subject will become mixed together with detection signals from phase-difference detection pixels corresponding to the main subject during the averaging or adding together of the detection signals is reduced, whereby the precision of focus position detection by phase-difference detection can be improved compared to the first embodiment.

In the focus control processing described above, steps 112, 130 to 132, 118, 136, 138, 124, and 126 are an example of processing by a controller of the present invention; more specifically, steps 130 to 132 are an example of processing by a controller according to fourth and sixth aspects, and steps 112, 118, and 136 to 138 are an example of processing by a controller according to an eighth aspect. Further, step 134 is an example of processing by a setting unit of the present invention (more specifically, a setting unit according to a fourth aspect).

In regard to the focus control processing described in the second embodiment (FIG. 7A, B) also, in a case where the determination in step 112 is NO as a result of the lens group 12A of the optical unit 12 not being in a focused state, the CPU 46 may also be configured to move to step 126 without performing step 118 and step 136 to step 140, cause focus position detection to be performed using contrast detection by the contrast AF detector 42, and perform focus control on the basis of the focus position detected by the contrast AF detector 42.

Third Embodiment

Next, a third embodiment of the present invention will be described. The present third embodiment has the same configuration as those of the first embodiment and the second embodiment, so the same reference signs will be given to each section, description of configurations will be omitted, and in regard to the focus control processing pertaining to the present third embodiment, only the sections differing from the focus control processing described in the first embodiment (FIG. 5) will be described below with reference to FIG. 10A, B.

In the focus control processing pertaining to the present third embodiment, like in the focus control processing described in the first embodiment (FIG. 5) and the focus control processing described in the second embodiment (FIG. 7A, B), focus position detection before focusing instruction is performed in step 100. However, in the present third embodiment, the detection region 76 in focus position detection before focusing instruction shown in FIG. 11A is divided into more numerous detection regions 78 along the phase-difference detection direction (the x direction) as shown in FIG. 11B. For example, in the example shown in FIG. 11B, the detection region 76 is divided into nine detection regions 78 along the x direction and, like in the first and second embodiments, is divided into three detection regions 78 in the y direction orthogonal to the phase-difference detection direction, so that, in total, twenty-seven detection regions 78 are disposed.

For this reason, in focus position detection before focusing instruction, the contrast AF detector 42 performs a computation of the focus evaluation values (contrast evaluation values) taking the twenty-seven detection regions 78 as units and detects the relationship between the focal point positions of the lens group 12A and the focus evaluation values of each of the individual detection regions 28.

Further, in the focus control processing pertaining to the present third embodiment, the CPU 46 moves to step 144 in a case where the determination in step 112 is YES as a result of the lens group 12A of the optical unit 12 being in a focused state; first, the CPU 46 calculates the deviations from the focus evaluation value peak position of the reference detection region 78 in regard to the focus evaluation value peak positions of the individual detection regions 78 outside the reference detection region 78 and determines whether or not the calculated deviations are within a preset threshold value.

Then, the CPU 46 conducts a search for whether or not, among plural detection region columns 84 each configured by plural detection regions 78 lined up along the y direction orthogonal to the phase-difference detection direction (see FIG. 11B; in the example described in the present third embodiment, 9×3=27 detection regions 78 are disposed, so there exist nine detection region columns 84 each configured by three detection regions 78 lined up along the y direction), there is a detection region column 84 in which the percentage of detection regions 78 whose deviation in focus evaluation value peak position from that of the reference detection region 78 is within the threshold value exceeds a predetermined percentage (e.g., 50%).

In the next step 146, the CPU 46 determines whether or not an applicable detection region column 84 was discovered in the search in step 144, whether or not the applicable detection region columns 84 are continuous in a number equal to or greater than a predetermined number in the x direction (the phase-difference detection direction), and whether or not a detection region column 84 including the reference detection region 78 exists in the range in which the applicable detection region columns 84 are continuous in a number equal to or greater than the predetermined number in the x direction (the phase-difference detection direction). In a case where the determination in step 146 is NO, the CPU 46 moves to step 126, causes focus position detection to be performed using contrast detection by the contrast AF detector 42, and performs focus control on the basis of the focus position detected by the contrast AF detector 42.

On the other hand, in a case where the determination in step 146 is YES, the CPU 46 moves to step 148 and sets, as a region to be used in focus position detection using phase-difference detection, a range on the light-receiving surface 66 corresponding to the region in which the detection region columns 84 in which the percentage of detection regions 78 whose deviation in focus evaluation value peak position from that of the reference detection region 78 is within the threshold value exceeds the predetermined percentage are continuous in a number equal to or greater than the predetermined number in the x direction. Then, in the next step 124, the CPU 46 causes focus position detection to be performed by the phase-difference AF detector 44 on the basis of the detection signals from the phase-difference detection pixels disposed in a range on the light-receiving surface 66 of the imaging element 16 corresponding to the region set in step 148 and performs focus control on the basis of the focus position detected by the phase-difference AF detector 44.

The above processing will be described further. As mentioned earlier, in focus position detection by phase-difference detection, the CPU 46 averages or adds together the detection signals of the plural phase-difference detection pixels positioned on the plural phase-difference detection lines 80 and whose positions along the phase-difference detection direction are the same, and the CPU 46 performs the detection of the amount of phase difference on the basis of the detection signals obtained through this averaging or adding together. For this reason, there is the problem that even though a drop in the precision of focus position detection arises if, in accompaniment with the averaging or adding together of the detection signals, detection signals from phase-difference detection pixels not corresponding to the main subject become mixed together with detection signals from phase-difference detection pixels corresponding to the main subject, the precision of focus position detection also drops due to the effect of noise and so forth also in a case where the number of phase-difference detection pixels subject to detection signal averaging or adding together is small.

For this reason, in the present third embodiment, the CPU 46 takes, as units, the detection region columns 84 including the plural detection regions 78 lined up along the y direction (the direction orthogonal to the phase-difference detection direction) and determines whether or not the percentage of detection regions 78 whose deviation in focus evaluation value peak position from that of the reference detection region 78 is within the threshold value exceeds the predetermined percentage (e.g., 50%). Further, focus position detection by phase-difference detection has the characteristic that when the length of the phase-difference detection region along the phase-difference detection direction becomes shorter, the detectable range of the focus position is limited, whereby the precision of focus position detection drops. For this reason, in the present third embodiment, the detection region 76 in focus position detection before focusing instruction is divided into more numerous detection regions 78 along the phase-difference detection direction (the x direction), and the CPU 46 determines whether or not detection region columns 84 in which the percentage of detection regions 78 whose deviation in focus evaluation value peak position is within the threshold value exceeds the predetermined percentage are continuous in a number equal to or greater than the predetermined number in the x direction and whether or not a detection region column 84 including the reference detection region 78 also exists in the range in which the detection region columns 84 are continuous in a number equal to or greater than the predetermined number and sets the range on the light-receiving surface 66 corresponding to the applicable region (the region in which the detection region columns 84 are continuous in a number equal to or greater than the predetermined number in the x direction) as the region on the light-receiving surface 66 to be used in focus position detection using phase-difference detection.

Figure 12B:
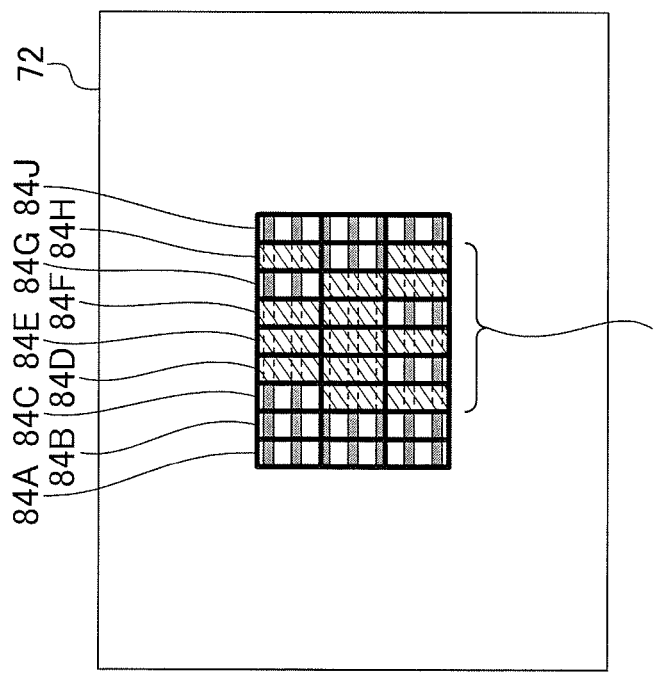
FIG. 12B is a plan view showing an example of a result of selecting a focus detection method and setting a focus detection region for phase-difference detection in the third embodiment.
Figure 12A:
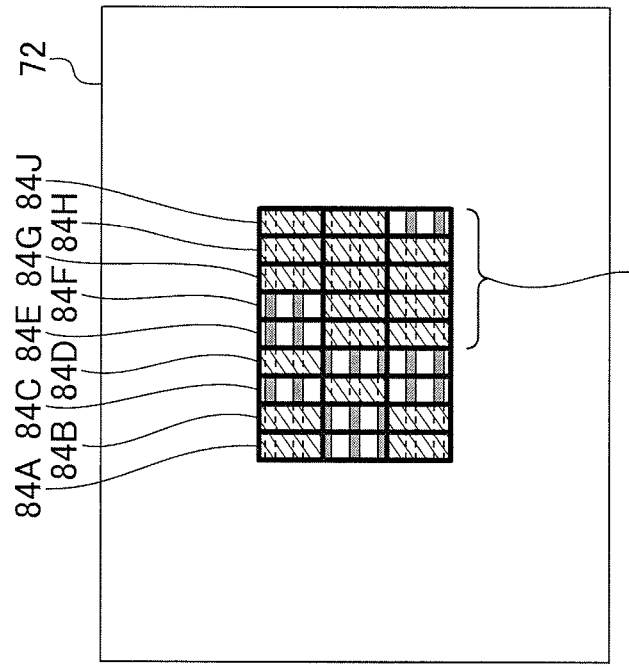
FIG. 12A is a plan view showing an example of a result of selecting a focus detection method and setting a focus detection region for phase-difference detection in the third embodiment.

Because of the above processing, as shown in FIG. 12A for example, in a case where the number of detection regions 78 in the first detection region column 84A whose deviation in focus evaluation value peak position is within the threshold value is 0 (a percentage of 0%), the number of detection regions 78 in the second detection region column 84B whose deviation in focus evaluation value peak position is within the threshold value is 0 (a percentage of 0%), the number of detection regions 78 in the third detection region column 84C whose deviation in focus evaluation value peak position is within the threshold value is 2 (a percentage of 66%), the number of detection regions 78 in the fourth detection region column 84D whose deviation in focus evaluation value peak position is within the threshold value is 2 (a percentage of 66%), the number of detection regions 78 in the fifth detection region column 84E whose deviation in focus evaluation value peak position is within the threshold value is 3 (a percentage of 100%), the number of detection regions 78 in the sixth detection region column 84F whose deviation in focus evaluation value peak position is within the threshold value is 2 (a percentage of 66%), the number of detection regions 78 in the seventh detection region column 84G whose deviation in focus evaluation value peak position is within the threshold value is 2 (a percentage of 66%), the number of detection regions 78 in the eighth detection region column 84H whose deviation in focus evaluation value peak position is within the threshold value is 2 (a percentage of 66%), and the number of detection regions 78 in the ninth detection region column 84J whose deviation in focus evaluation value peak position is within the threshold value is 0 (a percentage of 0%), six detection region columns 84 in which the percentage of detection regions 78 whose deviation in focus evaluation value peak position is within the threshold value exceeds the predetermined percentage are continuous from the third detection region column 84C to the seventh detection region column 84H, and the detection region column 84E including the reference detection region 78 also exists among those, so the range on the light-receiving surface 66 corresponding to detection region column 84C to detection region column 84H is set as the region on the light-receiving surface 66 to be used in focus position detection using phase-difference detection.

Further, as shown in FIG. 12B for example, in a case where the number of detection regions 78 in the first detection region column 84A whose deviation in focus evaluation value peak position is within the threshold value is 2 (a percentage of 66%), the number of detection regions 78 in the second detection region column 84B whose deviation in focus evaluation value peak position is within the threshold value is 2 (a percentage of 66%), the number of detection regions 78 in the third detection region column 84C whose deviation in focus evaluation value peak position is within the threshold value is 1 (a percentage of 33%), the number of detection regions 78 in the fourth detection region column 84D whose deviation in focus evaluation value peak position is within the threshold value is 1 (a percentage of 33%), the number of detection regions 78 in the fifth detection region column 84E whose deviation in focus evaluation value peak position is within the threshold value is 2 (a percentage of 66%), the number of detection regions 78 in the sixth detection region column 84F whose deviation in focus evaluation value peak position is within the threshold value is 2 (a percentage of 66%), the number of detection regions 78 in the seventh detection region column 84G whose deviation in focus evaluation value peak position is within the threshold value is 3 (a percentage of 100%), the number of detection regions 78 in the eighth detection region column 84H whose deviation in focus evaluation value peak position is within the threshold value is 3 (a percentage of 100%), and the number of detection regions 78 in the ninth detection region column 84J whose deviation in focus evaluation value peak position is within the threshold value is 2 (a percentage of 66%), the continuous length of the detection region columns 84 in which the percentage of detection regions 78 whose deviation in focus evaluation value peak position is within the threshold value exceeds the predetermined percentage is a maximum of five from the fifth detection region column 84E to the ninth detection region column 84J, and if this were less than the predetermined number, focus position detection would be performed using contrast detection.

In the above processing, focus position detection is performed using phase-difference detection using the range corresponding to the region, of the phase-difference detection region 68 on the light-receiving surface 66, in which detection regions 78 to which subjects that are the same as that of the reference detection region 78 correspond or to which subjects existing at distances close to the subject corresponding to the reference detection region 78 correspond are distributed in a percentage equal to or greater than the predetermined value in both the x direction and the y direction. Thus, the probability that detection signals from phase-difference detection pixels not corresponding to the main subject will become mixed together with detection signals from phase-difference detection pixels corresponding to the main subject during the averaging or adding together of the detection signals is reduced and the number of phase-difference detection pixels subject to detection signal averaging or adding together is also ensured, whereby the precision of focus position detection by phase-difference detection can be improved compared to both the first embodiment and the second embodiment.

Further, the CPU 46 moves to step 150 in a case where the determination in step 112 is NO as a result of the lens group 12A of the optical unit 12 not being in a focused state and the determination in step 118 is YES as a result of the focus evaluation value of the reference detection region 78 in the current state of the lens group 12A being equal to or greater than the predetermined value; first, the CPU 46 determines whether or not the focus evaluation values of the individual detection regions 78 outside the reference detection region 78 are equal to or greater than a reference value obtained by multiplying the focus evaluation value of the reference detection region 78 by a predetermined coefficient (a value less than 1, such as about 0.8 for example). Then, the CPU 46 conducts a search for whether or not, among the plural detection region columns 84, there is a detection region column 84 in which the percentage of detection regions 78 whose focus evaluation value is equal to or greater than the reference value exceeds a predetermined percentage (e.g., 50%).

In the next step 152, the CPU 46 determines whether or not an applicable detection region column 84 was discovered in the search in step 150, whether or not the applicable detection region columns 84 are continuous in a number equal to or greater than a predetermined number in the x direction (the phase-difference detection direction), and whether or not a detection region column 84 including the reference detection region 78 exists in the range in which the applicable detection region columns 84 are continuous in a number equal to or greater than the predetermined number in the x direction (the phase-difference detection direction). It can be inferred that the precision of focus position detection will be low if phase-difference detection is used, so the CPU 46 moves to step 126, causes focus position detection to be performed using contrast detection by the contrast AF detector 42, and performs focus control on the basis of the focus position detected by the contrast AF detector 42.

Further, in a case where the determination in step 152 is YES, the CPU 46 moves to step 154 and sets, as a region to be used in focus position detection using phase-difference detection, a range on the light-receiving surface 66 corresponding to the region in which the detection region columns 84 in which the percentage of detection regions 78 whose focus evaluation value is equal to or greater than the reference value exceeds the predetermined percentage are continuous in a number equal to or greater than the predetermined number in the x direction. Then, the CPU 46 moves to step 124, causes focus position detection to be performed by the phase-difference AF detector 44 on the basis of the detection signals from the phase-difference detection pixels disposed in a range on the light-receiving surface 66 of the imaging element 16 corresponding to the region set in step 154, and performs focus control on the basis of the focus position detected by the phase-difference AF detector 44.

In regard to the above processing also, focus position detection is performed using phase-difference detection using the range corresponding to the region, of the phase-difference detection region 68 on the light-receiving surface 66, in which detection regions 78 inferred as being detection regions to which subjects that are the same as that of the reference detection region 78 correspond or to which subjects existing at distances close to the subject corresponding to the reference detection region 78 correspond are distributed in a percentage equal to or greater than the predetermined value in both the x direction and the y direction, so the probability that detection signals from phase-difference detection pixels not corresponding to the main subject will become mixed together with detection signals from phase-difference detection pixels corresponding to the main subject during the averaging or adding together of the detection signals is reduced and the number of phase-difference detection pixels subject to detection signal averaging or adding together is also ensured, whereby the precision of focus position detection by phase-difference detection can be improved compared to both the first embodiment and the second embodiment.

In the focus control processing described above, steps 112, 144 to 146, 118, 150, 152, 124, and 126 are an example of processing by a controller of the present invention; more specifically, steps 144 to 146 are an example of processing by a controller according to fifth and seventh aspects, and steps 112, 118, and 150 to 152 are an example of processing by a controller according to an eighth aspect. Further, step 148 is an example of processing by a setting unit of the present invention (more specifically, a setting unit according to a fifth aspect).

In regard to the focus control processing described in the third embodiment (FIG. 10A, B) also, in a case where the determination in step 112 is NO as a result of the lens group 12A of the optical unit 12 not being in a focused state, the CPU 46 may also be configured to move to step 126 without performing step 118 and step 150 to step 154, cause focus position detection to be performed using contrast detection by the contrast AF detector 42, and perform focus control on the basis of the focus position detected by the contrast AF detector 42.

Fourth Embodiment

Next, a fourth embodiment of the present invention will be described. The present fourth embodiment has the same configuration as those of the first to third embodiments, so the same reference signs will be given to each section, description of configurations will be omitted, and in regard to the focus control processing pertaining to the present fourth embodiment, only the sections differing from the focus control processing described in the first embodiment (FIG. 5) will be described below with reference to FIG. 7A, B.

In the focus control processing pertaining to the present fourth embodiment, in step 160, focus position detection processing before focusing instruction is performed by the contrast AF detector 42 like in the focus control processing described in the first to third embodiments. However, in the focus position detection processing before focusing instruction pertaining to the present fourth embodiment, the CPU 46 also causes the contrast AF detector 42 to perform, in addition to the processing that computes the focus evaluation values (contrast evaluation values) for each of the individual detection regions 78 and detects the relationship between the focal point positions of the lens group 12A and the focus evaluation values for each of the individual detection regions 78, high-luminance region determination processing that determines, for each of the individual detection regions 78, whether or not there exists a high-luminance region whose luminance is equal to or greater than a threshold value (e.g., a region whose luminance is saturated) and photometric value minimum position detection processing that monitors changes in the photometric values of the individual detection regions 78 when the focal point position of the lens group 12A has been moved and detects, for each of the individual detection regions 78, the focal point position (photometric value minimum position) of the lens group 12A when the photometric values of the individual detection regions 78 become a minimum Further, in the focus control processing pertaining to the present fourth embodiment, in a case where the focus position detection method selected on the basis of the subject luminance and the focus control mode is phase-difference detection, the CPU 46 moves from step 108 to step 162 and acquires, from the contrast AF detector 42 as focus information in focus control before focusing instruction in step 160 as focus information obtained in focus position detection before focusing instruction in step 160 by the contrast AF detector 42, information indicating whether or not the lens group 12A is currently in a focused state, the focus evaluation value peak positions of the individual detection regions 78, the result of high-luminance region determination for the individual detection regions 78, and the photometric value minimum positions of the individual detection regions 42.

In the next step 112, like in the first embodiment, the CPU 46 determines whether or not the lens group 12A of the optical unit 12 is currently in a focused state. In the present fourth embodiment, in a case where the determination in step 112 is NO, the CPU 46 moves to step 126, causes focus position detection to be performed using contrast detection by the contrast AF detector 42, and performs focus control on the basis of the focus position detected by the contrast AF detector 42, but the CPU 46 may also be configured to perform step 118 to step 122 of the focus control processing described in the first embodiment (FIG. 5).

On the other hand, in a case where the determination in step 112 is YES, the CPU 46 moves to step 164. In a case where the determination in step 112 is YES, it can be judged that the focus evaluation value peak positions of the individual detection regions 78 acquired from the contrast AF detector 42 generally have high reliability. However, with the focus evaluation values in the contrast detection, if a high-luminance region exists within the regions whose focus evaluation values are to be computed, the effect from the high-luminance region becomes dominant, and if, for example, there is a change in luminance in the high-luminance region, the contrast evaluation value fluctuates in accordance therewith. For this reason, in regard to a detection region 78 that has been determined as having a high-luminance region by the high-luminance region determination processing among the focus evaluation value peak positions acquired from the contrast AF detector 42, the potential for it to point to a position differing from the original focus position is high.

For this reason, in step 164, in regard to detection regions 78 that have been determined as not having high-luminance regions by the high-luminance region determination processing, like in the first to third embodiments, the CPU 46 sets the focus evaluation value peak positions acquired from the contrast AF detector 42 to the focus positions, while in regard to detection regions 78 that have been determined as having high-luminance regions by the high-luminance region determination processing, the CPU 46 sets the photometric value minimum positions acquired from the contrast AF detector 42 to the focus positions on the basis of the fact that as the focal point position of the lens group 12A deviates from the focus positions, the areas of the high-luminance regions on the image increase and the photometric values of the detection regions 78 in which the high-luminance regions exist increase.

Further, in step 166, the CPU 46 calculates the deviations from the focus position of the reference detection region 78 in regard to the focus positions of the individual detection regions 78 outside the reference detection region 78 (the focus evaluation value peak positions in the detection regions 78 determined as not having high-luminance regions, and the photometric value minimum positions in the detection regions 78 determined as having high-luminance regions) and determines whether or not the calculated deviations are within a preset threshold value, whereby the CPU 46 counts the number of detection regions 78 whose deviation in focus position from that of the reference detection region 78 is within the threshold value. In the next step 116, the CPU 46 determines whether or not the number of detection regions 78 counted in step 166 (the number of detection regions 78 whose deviation in focus position from that of the reference detection region 78 is within the threshold value) is equal to or greater than a predetermined value.

Then, like in the first embodiment, in a case where the determination in step 116 is NO, the CPU 46 moves to step 126, causes focus position detection to be performed using contrast detection by the contrast AF detector 42, and performs focus control on the basis of the focus position detected by the contrast AF detector 42. Further, in a case where the determination in step 116 is YES, the CPU 46 moves to step 124, cause focus position detection to be performed using phase-difference detection by the phase-difference AF detector 44, and performs focus control on the basis of the focus position detected by the phase-difference AF detector 44.

In this way, in the present fourth embodiment, also in a case where the focus evaluation value peak positions of detection regions 78 in which high-luminance regions exist had pointed to positions differing from the original focus positions because of the effect of the high-luminance regions, this effect can be suppressed and a suitable detection method can be selected as the focus position detection method.

In the focus control processing described above, steps 160 and 162 are an example of processing by a setting unit of the present invention (more specifically, a setting unit according to a tenth aspect), step 164 is an example of processing by an updating unit of the present invention, and steps 166, 116, 124, and 126 are an example of processing by a controller of the present invention.

In the first and fourth embodiments, there was described an aspect where the CPU 46 performs only processing that selects contrast detection or phase-difference detection as the focus position detection method and where the entire phase-difference detection region 68 is used in focus position detection using phase-difference detection, but the present invention is not limited to this; for example, the CPU 46 may also be configured to set, as the region to be used in focus position detection using phase-difference detection, a region on the light-receiving surface 66 corresponding to a region including the detection regions 78 whose deviation in focus evaluation value peak position from that of the reference detection region 78 is within the threshold value, or detection regions 78 whose focus evaluation value is equal to or greater than the reference value set on the basis of the focus evaluation value of the reference detection region 78, or detection regions 78 whose deviation in focus position from that of the reference detection region 78 is within the threshold value.

Further, in the second embodiment, there was described an aspect combining processing that selects which of contrast detection and phase-difference detection to use in focus position detection by determining whether or not, among the plural detection region rows 82, there is a detection region row 82 in which the percentage of detection regions 78 whose deviation in focus evaluation value peak position from that of the reference detection region 78 is within the threshold value exceeds the predetermined percentage and processing that sets, as the region on the light-receiving surface 66 to be used in focus position detection using phase-difference detection, a range on the light-receiving surface 66 corresponding to the detection region row 82 in which the percentage of detection regions 78 whose deviation in focus evaluation value peak position from that of the reference detection region 78 is within the threshold value exceeds the predetermined percentage. However, the present invention is not limited to this, and in a case where, for example, there is a restriction or the like such as being unable to change the region on the light-receiving surface 66 to be used in focus position detection using phase-difference detection, the CPU 46 may also singly perform processing that selects which of contrast detection and phase-difference detection to use in focus position detection by determining whether or not, among the plural detection region rows 82, there is a detection region row 82 in which the percentage of detection regions 78 whose deviation in focus evaluation value peak position from that of the reference detection region 78 is within the threshold value exceeds the predetermined percentage. The invention according to the sixth aspect also includes this aspect in its scope of rights.

Further, in the third embodiment, there was described an aspect combining processing that selects which of contrast detection and phase-difference detection to use in focus position detection by determining whether or not detection region columns 84 in which the percentage of detection regions 78 whose deviation in focus evaluation value peak position from that of the reference detection region 78 is within the threshold value exceeds the predetermined percentage are continuous in a number equal to or greater than the predetermined number in the x direction (the phase-difference detection direction) and whether or not a detection region column 84 including the reference detection region 78 exists among them and processing that sets, as the region on the light-receiving surface 66 to be used in focus position detection using phase-difference detection, a range on the light-receiving surface 66 corresponding to the region in which detection region columns 84 in which the percentage of detection regions 78 whose deviation in focus evaluation value peak position from that of the reference detection region 78 is within the threshold value exceeds the predetermined percentage are continuous in a number equal to or greater than the predetermined number in the x direction, but the present invention is not limited to this, and in a case where, for example, there is a restriction or the like such as being unable to change the region on the light-receiving surface 66 to be used in focus position detection using phase-difference detection, the CPU 46 may also singly perform processing that selects which of contrast detection and phase-difference detection to use in focus position detection by determining whether or not detection region columns 84 in which the percentage of detection regions 78 whose deviation in focus evaluation value peak position from that of the reference detection region 78 is within the threshold value exceeds the predetermined percentage are continuous in a number equal to or greater than the predetermined number in the x direction (the phase-difference detection direction) and whether or not a detection region column 84 including the reference detection region 78 exists among them. The invention according to the seventh aspect also includes this aspect in its scope of rights.

Figure 10A:
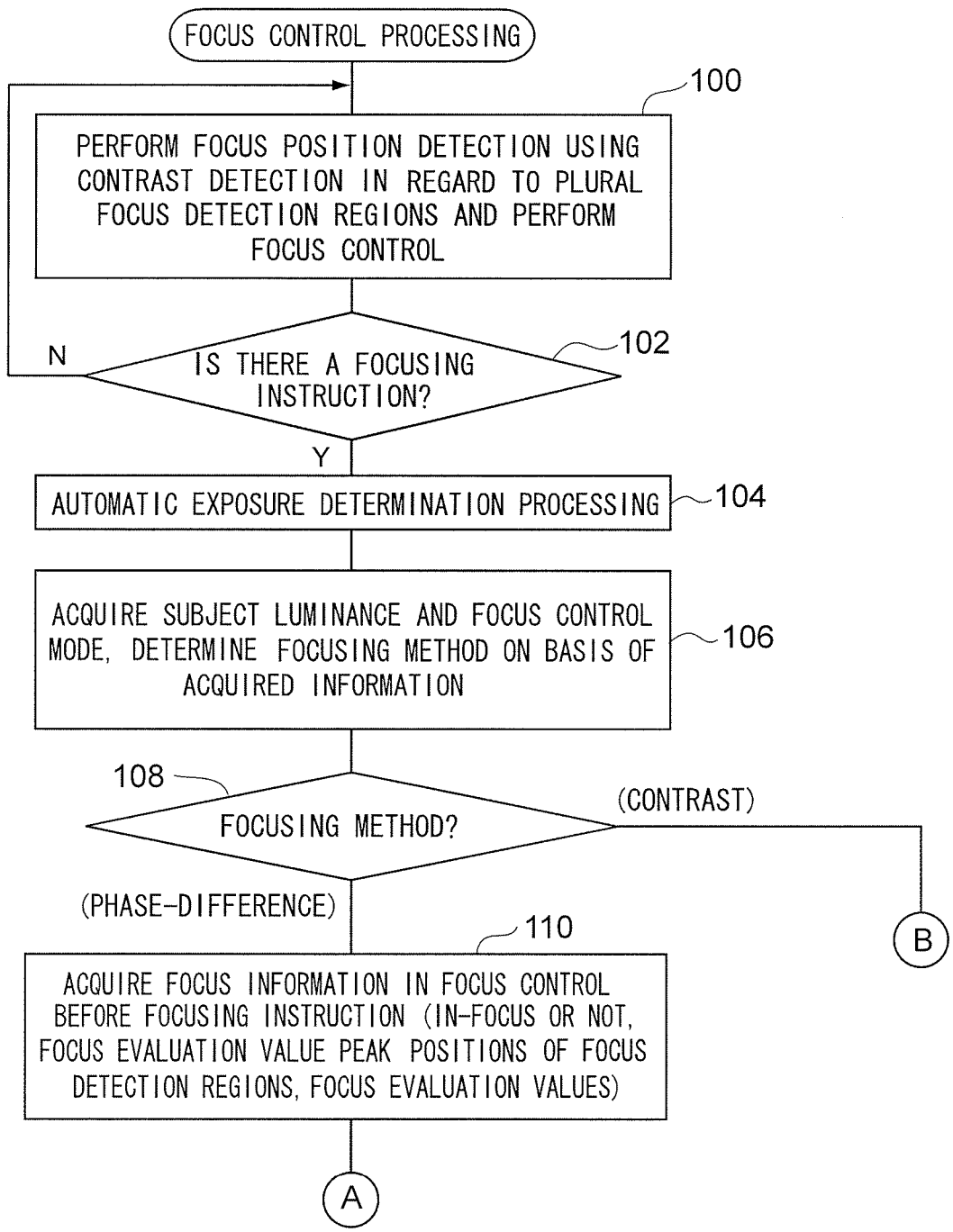
FIG. 10A is a flowchart showing focus control processing pertaining to a third embodiment.

Further, in the fourth embodiment, there was described an aspect combining, with the focus control processing described in the first embodiment (FIG. 5), processing that performs, in focus position detection before focusing instruction, high-luminance region determination and photometric value minimum position detection for each of the individual detection regions 78 and uses the photometric value minimum positions as the focus positions in regard to detection regions 78 determined as having high-luminance regions, but the present invention is not limited to this and may also combine this with the focus control processing described in the second embodiment (FIG. 7A,B) or the focus control processing described in the third embodiment (FIG. 10A, B).

Further, in the above description, there was described an aspect where the acquiring unit, the controller, the setting unit, and the updating unit of the present invention are realized as a result of the focus control program being executed by the CPU 46 of the imaging device 10, but the present invention is not limited to this, and each of the above units can also be realized by hardware such as an electronic circuit—specifically a semiconductor integrated circuit and more specifically an ASIC (Application-Specific Integrated Circuit).

Further, in the above description, there was described an aspect where the present invention was applied to the monocular imaging device 10 in which the optical unit 12 and the imaging element 16 were disposed in one set, but the present invention is not limited to this; for example, the present invention may also be applied to an imaging device in which imaging units including optical units and imaging elements are disposed in plural sets for the purpose of capturing stereoscopic images; for example, phase-difference detection or contrast detection is selected on the basis of the image captured by one imaging unit and focus control is performed, and in the other imaging unit, the result of the selection of phase-difference detection or contrast detection is acquired and focus control is performed in accordance with the acquired selection result.

Further, in the above description, there was described an aspect where the present invention was applied to an imaging device that captures still images, but the present invention is not limited to this and can also be applied to selecting the focus position detection method in an imaging device that captures moving images.

Further, in the above description, there was described an aspect where the focus control program, which is an example of an imaging device control program pertaining to the present invention, was stored (installed) beforehand in the flash ROM 50, but the imaging device control program pertaining to the present invention can also be provided in a form where it is recorded in a recording medium such as a CD-ROM or a DVD-ROM.

In the first aspect, there is disposed the imaging unit that includes an imaging element in which phase-difference detection pixels are disposed in a partial region within a light-receiving surface and captures a subject with light made incident on the light-receiving surface of the imaging element via an optical system whose focal point position is movable; on the basis of image signals obtained by image capture by the imaging unit, the first detector repeatedly computes, while moving the focal point position of the optical system, a focus evaluation value within a detection region set in an image expressed by the image signals and detects a focus position in the detection region from the relationship between the focal point positions of the optical system and the focus evaluation values; and a second detector detects a focus position on the basis of detection signals output from the phase-difference detection pixels. The image signals that the first detector uses in the computation of the focus evaluation values may be image signals output from normal pixels outside the phase-difference detection pixels of the imaging element or may be signals in which signals obtained by correcting the detection signals output from the phase-difference detection pixels have been added to the image signals output from the normal pixels. Further, the image signals used in the computation of the focus evaluation values may be analog or digital. Moreover, it suffices for the focus evaluation values to be values with which the state of focus can be evaluated; as an example, contrast is preferred, but another evaluation value may also be used. Further, the acquiring unit causes processing that detects focus positions of plural detection regions set in the image captured by the imaging unit to be repeated by the first detector and, when focusing is instructed via an instructing unit, acquires the focus positions of the plural detection regions detected immediately before by the first detector.

Here, the focus positions detected in the plural detection regions by the first detector change in accordance with the distances to the subjects corresponding to the individual detection regions. For this reason, detection regions whose focus positions acquired by the acquiring unit are the same or whose deviation in acquired focus position is small can be judged as corresponding to subjects existing at the same distance or proximate distances, while detection regions whose deviation in acquired focus position is large can be judged as corresponding to subjects whose distances differ. Consequently, detection regions corresponding to subjects existing at the same distance or proximate distances among the plural detection regions can be discriminated on the basis of the deviations in the focus positions of the plural detection regions, and the general size of the distribution range, on the image, of subjects existing at the same distance or proximate distances—that is, whether or not the captured subject is a subject with which the precision of focus position detection will drop if phase-difference detection is used—can be discriminated from the discrimination result.

On the basis of the above, in the imaging device pertaining to the first aspect, when focusing is instructed via the instructing unit, the controller causes focus position detection to be performed by the detector among the first detector and the second detector that has been selected on the basis of the deviations in the focus positions of the plural detection regions acquired by the acquiring unit and causes focus control of the optical system by a focus controller to be performed using the focus position detected by the selected detector, so it becomes possible to suppress a drop in focus control precision in a case where a subject with which the precision of focus position detection will drop if phase-difference detection is used is to be captured.

In the first aspect, "the number of detection regions whose deviation in detected focus position with respect to the focus position detected in the reference detection region is within the threshold value" corresponds to the size of the distribution range of subjects existing at the same distance or proximate distances in the image captured by the imaging element. In the first aspect, the controller selects the first detector in a case where the number of detection regions is less than the predetermined value—that is, a case where the size of the distribution range of subjects existing at the same distance or proximate distances in the image captured by the imaging element is relatively small—and selects the second detector in a case where the number of detection regions is equal to or greater than the predetermined value—that is, a case where the size of the distribution range of subjects existing at the same distance or proximate distances in the image captured by the imaging element is relatively large—so a drop in the precision of focus control can be suppressed in a case where a subject with which the precision of focus position detection will drop if phase-difference detection is used is to be captured.

In the invention pertaining to the first aspect, as the reference detection region, for example, a detection region positioned in the center, or the vicinity of the center, of the disposition of the plural detection regions or a detection region positioned in the center, or the vicinity of the center, of the image can be applied.

In the first aspect, the plural detection regions may be regions obtained by dividing the entire image into plural regions, but as a second aspect for example, it is preferred that the plural detection regions be regions obtained by dividing, into plural regions, a region on the image corresponding to a region containing the region in which the phase-difference detection pixels within the light-receiving surface of the imaging element are disposed. Because of this, the precision of discrimination in the discrimination of whether or not a subject with which the precision of focus position detection will drop if phase-difference detection is used is to be captured from the deviations in the focus positions of the plural detection regions can be improved.

Further, in the invention of the first or second aspect, as a third aspect for example, it is preferred to dispose a setting unit which, in a case where the second detector has been selected by the controller, sets a range, of the region in which the phase-difference detection pixels within the light-receiving surface of the imaging element are disposed, for the second detector to use, in focus position detection, the detection signals output from the phase-difference detection pixels, on the basis of the distribution of detection regions whose deviation in detected focus position with respect to the focus position detected in the reference detection region among the plural detection regions is within the preset threshold value. Because of this, it becomes possible to remove, from the range that the second detector uses in focus position detection, ranges corresponding to detection regions to which subjects existing at distances away from the subject corresponding to the reference detection region correspond, and it becomes possible to lower the percentage, of the range that the second detector uses in focus position detection, occupied by ranges corresponding to detection regions to which subjects existing at distances away from the subject corresponding to the reference detection region correspond, so it becomes possible to improve the precision of focus position detection by the second detector.

Further, in the third aspect, in a case where the imaging device has a configuration where the plural detection regions are configured by adjacently disposing, in a matrix, plural detection regions in a first direction that is a phase-difference detection direction of the second detector and plural detection regions in a second direction that intersects the first direction and the controller selects the second detector in a case where, among plural detection region rows each configured by plural detection regions lined up along the first direction, there is a detection region row in which the percentage of detection regions whose deviation in detected focus position with respect to the focus position detected in the reference detection region among the plural detection regions is within the preset threshold value exceeds a set value, as a fourth aspect for example, the setting unit can be configured to set the range for the second detector to use, in focus position detection, the detection signals output from the phase-difference detection pixels to a range corresponding to the detection region row in which the percentage of detection regions whose deviation in detected focus position is within the threshold value exceeds the set value.

Because of this, in a case where the second detector averages or adds together, and thereafter uses in focus position detection, detection signals output from plural phase-difference detection pixels whose positions along the first direction within the light-receiving surface of the imaging element are different and whose positions along the second direction are the same, the precision of focus position detection by the second detector can be suppressed from dropping due to detection signals from phase-difference detection pixels corresponding to subjects at different distances ending up being mixed together by the averaging or adding together of the detection signals.

Further, in the third aspect, in a case where the imaging device has a configuration where the plural detection regions are configured by adjacently disposing, in a matrix, plural detection regions in a first direction that is a phase-difference detection direction of the second detector and plural detection regions in a second direction that intersects the first direction and the controller selects the second detector in a case where, among plural detection region columns each configured by plural detection regions lined up along the second direction, detection region columns in which the percentage of detection regions whose deviation in detected focus position with respect to the focus position detected in the reference detection region among the plural detection regions is within the preset threshold value exceeds a set value are continuous in a number equal to or greater than a predetermined number along the first direction, as a fifth aspect for example, the setting unit can be configured to set the range for the second detector to use, in focus position detection, the detection signals output from the phase-difference detection pixels to a range corresponding to the region in which the detection region columns in which the percentage of detection regions whose deviation in detected focus position is within the threshold value exceeds the set value are continuous in a number equal to or greater than the predetermined number along the first direction.

Because of this, in a case where the second detector averages or adds together, and thereafter uses in focus position detection, detection signals output from plural phase-difference detection pixels whose positions along the first direction within the light-receiving surface of the imaging element are different and whose positions along the second direction are the same, the probability that the precision of focus position detection by the second detector will drop due to detection signals from phase-difference detection pixels corresponding to subjects at different distances ending up being mixed together by the averaging or adding together of the detection signals can be reduced, a decrease in the number of phase-difference detection pixels subject to detection signal averaging or adding together can also be suppressed, and the precision of focus position detection by the second detector can be improved.

Further, in any of the first to fourth aspects, in a case where the plural detection regions are configured by adjacently disposing, in a matrix, plural detection regions in a first direction that is a phase-difference direction of the second detector and plural detection regions in a second direction that intersects the first direction, as a sixth aspect for example, the controller may be configured to select the first detector in a case where, among plural detection region rows each configured by plural detection regions lined up along the first direction, there is no detection region row in which the percentage of detection regions whose deviation in detected focus position with respect to the focus position detected in the reference detection region among the plural detection regions is within the preset threshold value exceeds a set value and select the second detector in a case where, among the plural detection region rows, there is a detection region row in which the percentage of detection regions whose deviation in detected focus position with respect to the focus position detected in the reference detection region is within the threshold value exceeds the set value.

In the case of detecting the focus position using phase-difference detection, the precision of focus position detection drops if subjects existing at the same distance or proximate distances are not distributed across a certain length along the phase-difference detection direction on the image. With respect to this, in the sixth aspect, the controller selects the first detector in a case where, among plural detection region rows each configured by plural detection regions lined up along the first direction, there is no detection region row in which the percentage of detection regions whose deviation in detected focus position with respect to the focus position detected in the reference detection region among the plural detection regions is within the preset threshold value exceeds a set value, so in a case where it is inferred that the precision of focus position detection will be low if phase-difference detection is used, the focus position detected using phase-difference detection is not used in focus control.

On the other hand, the controller selects the second detector in a case where, among the plural detection region rows, there is a detection region row in which the percentage of detection regions whose deviation in detected focus position with respect to the focus position detected in the reference detection region is within the threshold value exceeds the set value, so in a case where it is inferred that the focus position can be detected with high detection precision using phase-difference detection, the focus position detected using phase-difference detection is used in focus control. Consequently, also in a case where the sixth aspect is applied, a drop in the precision of focus control can be suppressed in a case where a subject with which the precision of focus position detection will drop if phase-difference detection is used is to be captured.

Further, in any of the first, second, third, and fifth aspects, in a case where the plural detection regions are configured by adjacently disposing, in a matrix, plural detection regions in a first direction that is a phase-difference detection direction of the second detector and plural detection regions in a second direction that intersects the first direction, as a seventh aspect for example, the controller may be configured to select the first detector in a case where, among plural detection region columns each configured by plural detection regions lined up along the second direction, detection region columns in which the percentage of detection regions whose deviation in detected focus position with respect to the focus position detected in the reference detection region among the plural detection regions is within the preset threshold value exceeds a set value are not continuous in a number equal to or greater than a predetermined number along the first direction and select the second detector in a case where detection region columns in which the percentage of detection regions whose deviation in detected focus position is within the threshold value exceeds the set value are continuous in a number equal to or greater than the predetermined number along the first direction.

In focus position detection using phase-difference detection, oftentimes detection signals output from plural phase-difference detection pixels lined up in a direction intersecting the phase-difference detection direction on the light-receiving surface of the imaging element are averaged and used in order to reduce the effect of noise and so forth, and if subjects existing at the same distance or proximate distances are distributed across a certain length along a direction intersecting the phase-difference detection direction on the image, the effect of noise and so forth is felt and the precision of focus position detection drops. With respect to this, in the seventh aspect, the controller selects the first detector in a case where, among plural detection region columns each configured by plural detection regions lined up along the second direction, detection region columns in which the percentage of detection regions whose deviation in detected focus position with respect to the focus position detected in the reference detection region among the plural detection regions is within the preset threshold value exceeds a set value are not continuous in a number equal to or greater than a predetermined number along the first direction, so in a case where it is inferred that the precision of focus position detection will be low if phase-difference detection is used, the focus position detected using phase-difference detection is not used in focus control.

On the other hand, the controller selects the second detector in a case where, among the plural detection region columns, detection region columns in which the percentage of detection regions whose deviation in detected focus position is within the threshold value exceeds the set value are continuous in a number equal to or greater than the predetermined number along the first direction, so in a case where it is inferred that the focus position can be detected with high detection precision using phase-difference detection, the focus position detected using phase-difference detection is used in focus control. Consequently, also in a case where the seventh aspect is applied, a drop in the precision of focus control can be suppressed in a case where a subject with which the precision of focus position detection will drop if phase-difference detection is used is to be captured.

As the reference detection region in the sixth and seventh aspects also, for example, a detection region positioned in the center, or the vicinity of the center, of the disposition of the plural detection regions or a detection region positioned in the center, or the vicinity of the center, of the image can be applied.

Further, in any of the first to seventh aspects, as an eighth aspect for example, it is preferred that the imaging device be configured in such a way that while the acquiring unit is causing the processing that detects the focus positions of the plural detection regions to be repeated by the first detector, the acquiring unit causes focus control of the optical system using the focus position detected by the first detector to be performed by the focus controller and, when focusing is instructed via the instructing unit, also acquires the focus evaluation values of the plural detection regions computed immediately before by the first detector, and the controller selects the first detector or the second detector on the basis of the deviations in the focus positions of the plural detection regions acquired by the acquiring unit in a case where the optical system is in a focused state when focusing has been instructed via the instructing unit and selects the first detector or the second detector on the basis of the sizes of and the deviations in the focus evaluation values of the plural detection regions acquired by the acquiring unit in a case where the optical system is not in a focused state when focusing has been instructed via the instructing unit.

The first detector detects the focus position by repeating computation of the focus evaluation values while moving the focal point position of the optical system, so cases where the first detector is in the middle of detecting (in the middle of searching) the focus positions can arise at the timing when focusing has been instructed via the instructing unit. With respect to this, in the eighth aspect, while the acquiring unit is causing the detection of the focus positions of the plural detection regions in the image to be repeated by the first detector, the acquiring unit causes focus control of the optical system using the focus position detected by the first detector to be performed by the focus controller and, when focusing is instructed via the instructing unit, also acquires the focus evaluation values of the plural detection regions computed immediately before by the first detector.

Here, in the focus position detected by the first detector, the focus evaluation values become a maximum, so it can be inferred whether the optical system is close to or far from a focused state on the basis of the sizes of the focus evaluation values of the plural detection regions acquired by the acquiring unit, and in a case where it can be inferred that the optical system is close to a focused state, detection regions corresponding to subjects existing at the same distance or proximate distances among the plural detection regions can be inferred on the basis of the deviations in the focus evaluation values of the plural detection regions acquired by the acquiring unit. On the basis of the above, the controller pertaining to the eighth aspect selects the first detector or the second detector on the basis of the sizes of and deviations in the focus evaluation values of the plural detection regions acquired by the acquiring unit in a case where the optical system is not in a focused state when focusing has been instructed via the instructing unit. Because of this, a drop in the precision of focus control can be suppressed also in a case where the optical system is not in a focused state when focusing has been instructed.

In the eighth aspect, the selecting of the first detector or the second detector on the basis of the sizes of and deviations in the focus evaluation values of the plural detection regions specifically can be performed in such a way that, for example, the controller selects the first detector in a case where the focus evaluation value of the reference detection region is less than a reference value and a case where the number of detection regions whose deviation in computed focus evaluation value with respect to the focus evaluation value of the reference detection region among the plural detection regions is within a value obtained by multiplying the focus evaluation value of the reference detection region by a predetermined coefficient is less than a predetermined value and selects the second detector in a case where the focus evaluation value of the reference detection region is equal to or greater than the reference value and the number of detection regions whose deviation in computed focus position is within the value obtained by multiplying the focus evaluation value of the reference detection region by the predetermined coefficient is equal to or greater than the predetermined value.

Further, in the eighth aspect, the selecting of the first detector or the second detector on the basis of the sizes of and deviations in the focus evaluation values of the plural detection regions in a case where the plural detection regions are configured by adjacently disposing, in a matrix, plural detection regions in a first direction that is a phase-difference detection direction of the second detector and plural detection regions in a second direction that intersects the first direction specifically may also be performed in such a way that, for example, the controller selects the first detector in a case where the focus evaluation value of the reference detection region is less than the reference value and a case where, among plural reference detection rows each configured by plural detection regions lined up along the first direction, there is no detection region row in which the percentage of detection regions whose deviation in computed focus evaluation value with respect to the focus evaluation value of the reference detection region among the plural detection regions is within a value obtained by multiplying the focus evaluation value of the reference detection region by a predetermined coefficient exceeds a set value and selects the second detector in a case where the focus evaluation value of the reference detection region is equal to or greater than the reference value and where, among the plural detection region rows, there is a detection region row in which the percentage of detection regions whose deviation in computed focus evaluation value is within the value obtained by multiplying the focus evaluation value of the reference detection region by the predetermined coefficient exceeds the set value.

Further, in the eighth aspect, the selecting of the first detector or the second detector on the basis of the sizes of and deviations in the focus evaluation values of the plural detection regions in a case where the plural detection regions are configured by adjacently disposing, in a matrix, plural detection regions in a first direction that is a phase-difference detection direction of the second detector and plural detection regions in a second direction that intersects the first direction may also be performed in such a way that, for example, the controller selects the first detector in a case where the focus evaluation value of the reference detection region is less than the reference value and a case where, among plural reference detection columns each configured by plural detection regions lined up along the second direction, detection region columns in which the percentage of detection regions whose deviation in computed focus evaluation value with respect to the focus evaluation value of the reference detection region among the plural detection regions is within a value obtained by multiplying the focus evaluation value of the reference detection region by a predetermined coefficient exceeds a set value are not continuous in a number equal to or greater than a predetermined number along the first direction and selects the second detector in a case where the focus evaluation value of the reference detection region is equal to or greater than the reference value and where detection region columns in which the percentage of detection regions whose deviation in computed focus evaluation value with respect to the focus evaluation value of the reference detection region is within the value obtained by multiplying the focus evaluation value of the reference detection region by the predetermined coefficient exceeds the set value are continuous in a number equal to or greater than the predetermined number along the first direction.

Incidentally, in the detection of the focus positions by the first detector, there is the problem that the precision of focus position detection drops in a case where a high-luminance region such as a point light source existed in the image captured by the imaging element. In consideration of this, in any aspect of the first to eighth aspects, as a ninth aspect for example, it is preferred that the acquiring unit cause processing that detects photometric values when the focal point position is in each position and processing that determines whether or not there is a high-luminance region within the detection regions to be performed in addition to the processing that detects the focus positions for each of the plural detection regions in the image by the first determining unit, and when focusing is instructed via the instructing unit, the acquiring unit acquires the focus positions of the plural detection regions detected immediately before by the first detector, the photometric values of the plural detection regions when the focal point position is in each position, and the determination result of whether or not there is a high-luminance region in the plural detection regions, and it is preferred that the imaging device further includes an updating unit that updates, among the focus positions of the plural detection regions acquired by the acquiring unit, focus positions in detection regions for which the determination result acquired by the acquiring unit is that there is a high-luminance region to positions when the photometric values of the detection regions acquired by the acquiring unit become a minimum.

Because of this, in regard to a detection region among the plural detection regions that has been determined by the first detector as having a high-luminance region, the focus position detected by the first detector becomes updated to a position when the photometric value of that detection region becomes a minimum. In a detection region having a high-luminance region, the area of the high-luminance region on the image increases moving away from a focused state and the photometric value also increases in accompaniment therewith, so as described above the position when the photometric value becomes a minimum becomes the focus position or a position close to the focus position. Consequently, according to the ninth aspect, the suitable focus position detection method can be selected also in a case where a high-luminance region such as a point light source existed in the image captured by the imaging unit, whereby a drop in the precision of focus control can be suppressed.

According to the method for controlling an imaging device pertaining to a tenth aspect, like in the first aspect, it becomes possible to suppress a drop in the precision of focus control in a case where a subject with which the precision of focus position detection will drop if phase-difference detection is used is to be captured.

A computer-readable storage medium pertaining to a twelfth aspect of the present invention stores a program for causing a computer disposed in the imaging device including the imaging unit, the first detector, and the second detector to function as the acquiring unit and the controller, so when the computer executes the imaging device control program pertaining to the invention of the twelfth aspect, the imaging device including the imaging unit, the first detector, and the second detector functions as the imaging device according to the first aspect, and like in the first aspect, it becomes possible to suppress a drop in the precision of focus control in a case where a subject with which the precision of focus position detection will drop if phase-difference detection is used is to be captured.

As described above, the present invention has the superior effect that it can suppress the precision of focus control from dropping in a case where a subject with which the precision of focus position detection will drop if phase-difference correction is used is to be captured, because the present invention causes the detection of focus positions of plural detection regions in an image to be repeated by a first detector which, on the basis of image signals obtained by image capture, repeatedly computes, while moving a focal point position of an optical system, a focus evaluation value of a detection region set in an image and detects a focus position in the detection region from the relationship between the focal point positions and the focus evaluation values, and when focusing is instructed, the present invention acquires the focus positions of the plural detection regions detected immediately before by the first detector, causes focus position detection to be performed by the detector among the first detector and the second detector that has been selected on the basis of deviations in the acquired focus positions of the plural detection regions, and causes focus control of the optical system by a focus controller to be performed using the focus position detected by the selected detector.

All publications, patent applications, and technical standards described in the present specification are incorporated herein by reference to the same extent as if each publication, patent application, or technical standard was specifically and individually indicated to be incorporated by reference.

What is claimed is:

1. An imaging device comprising:
an imaging unit that includes an imaging element in which phase-difference detection pixels are disposed in a partial region within a light-receiving surface and captures a subject with light made incident on the light-receiving surface of the imaging element via an optical system whose focal point position is movable;
a first detector which, on the basis of image signals obtained by image capture by the imaging unit, repeatedly computes, while moving the focal point position of the optical system, a focus evaluation value within a detection region set in an image expressed by the image signals and detects a focus position in the detection region from the relationship between the focal point positions and the focus evaluation values;

a second detector that detects a focus position on the basis of detection signals output from the phase-difference detection pixels;

an acquiring unit that causes processing that detects focus positions of plural detection regions set in the image to be repeated by the first detector and, when focusing is instructed via an instructing unit, acquires the focus positions of the plural detection regions detected immediately before by the first detector; and a controller which, when focusing is instructed via the instructing unit, selects the first detector in a case where the number of detection regions whose deviation in detected focus position with respect to a focus position detected in a reference detection region among the plural detection regions is within a preset threshold value is less than a predetermined value, selects the second detector in a case where the number of detection regions whose deviation in detected focus position is within the threshold value is equal to or greater than the predetermined value, causes focus position detection to be performed by the selected detector, and causes focus control of the optical system by a focus controller to be performed using the focus position detected by the selected detector.

2. The imaging device according to claim 1, wherein the plural detection regions are regions obtained by dividing, into plural regions, a region on the image corresponding to a region containing the region in which the phase-difference detection pixels within the light-receiving surface of the imaging element are disposed.

3. The imaging device according to claim 1, further comprising a setting unit which, in a case where the second detector has been selected by the controller, sets a range, of the region in which the phase-difference detection pixels within the light-receiving surface of the imaging element are disposed, for the second detector to use, in focus position detection, the detection signals output from the phase-difference detection pixels, on the basis of the distribution of detection regions whose deviation in detected focus position with respect to the focus position detected in the reference detection region among the plural detection regions is within the preset threshold value.

4. The imaging device according to claim 2, further comprising a setting unit which, in a case where the second detector has been selected by the controller, sets a range, of the region in which the phase-difference detection pixels within the light-receiving surface of the imaging element are disposed, for the second detector to use, in focus position detection, the detection signals output from the phase-difference detection pixels, on the basis of the distribution of detection regions whose deviation in detected focus position with respect to the focus position detected in the reference detection region among the plural detection regions is within the preset threshold value.

5. The imaging device according to claim 3, wherein
the plural detection regions are configured by adjacently disposing, in a matrix, plural detection regions in a first direction that is a phase-difference detection direction of the second detector and plural detection regions in a second direction that intersects the first direction,
the controller selects the second detector in a case where, among plural detection region rows each configured by plural detection regions lined up along the first direction, there is a detection region row in which the percentage of detection regions whose deviation in detected focus position with respect to the focus position detected in the reference detection region among the plural detection regions is within the preset threshold value exceeds a set value, and
the setting unit sets the range for the second detector to use, in focus position detection, the detection signals output from the phase-difference detection pixels to a range corresponding to the detection region row in which the percentage of detection regions whose deviation in detected focus position is within the threshold value exceeds the set value.

6. The imaging device according to claim 4, wherein
the plural detection regions are configured by adjacently disposing, in a matrix, plural detection regions in a first direction that is a phase-difference detection direction of the second detector and plural detection regions in a second direction that intersects the first direction,
the controller selects the second detector in a case where, among plural detection region rows each configured by plural detection regions lined up along the first direction, there is a detection region row in which the percentage of detection regions whose deviation in detected focus position with respect to the focus position detected in the reference detection region among the plural detection regions is within the preset threshold value exceeds a set value, and
the setting unit sets the range for the second detector to use, in focus position detection, the detection signals output from the phase-difference detection pixels to a range corresponding to the detection region row in which the percentage of detection regions whose deviation in detected focus position is within the threshold value exceeds the set value.

7. The imaging device according to claim 3, wherein
the plural detection regions are configured by adjacently disposing, in a matrix, plural detection regions in a first direction that is a phase-difference detection direction of the second detector and plural detection regions in a second direction that intersects the first direction,
the controller selects the second detector in a case where, among plural detection region columns each configured by plural detection regions lined up along the second direction, detection region columns in which the percentage of detection regions whose deviation in detected focus position with respect to the focus position detected in the reference detection region among the plural detection regions is within the preset threshold value exceeds a set value are continuous in a number equal to or greater than a predetermined number along the first direction, and
the setting unit sets the range for the second detector to use, in focus position detection, the detection signals output from the phase-difference detection pixels to a range corresponding to the region in which the detection region columns in which the percentage of detection regions whose deviation in detected focus position is within the threshold value exceeds the set value are continuous in a number equal to or greater than the predetermined number along the first direction.

8. The imaging device according to claim 4, wherein
the plural detection regions are configured by adjacently disposing, in a matrix, plural detection regions in a first direction that is a phase-difference detection direction of the second detector and plural detection regions in a second direction that intersects the first direction, the controller selects the second detector in a case where, among plural detection region columns each configured by plural detection regions lined up along the second direction, detection region columns in which the percentage of detection regions whose deviation in detected focus position with respect to the focus position detected in the reference detection region among the plural detection regions is within the preset threshold value exceeds a set value are continuous in a number equal to or greater than a predetermined number along the first direction, and the setting unit sets the range for the second detector to use, in focus position detection, the detection signals output from the phase-difference detection pixels to a range corresponding to the region in which the detection region columns in which the percentage of detection regions whose deviation in detected focus position is within the threshold value exceeds the set value are continuous in a number equal to or greater than the predetermined number along the first direction.

9. The imaging device according to claim 1, wherein the plural detection regions are configured by adjacently disposing, in a matrix, plural detection regions in a first direction that is a phase-difference detection direction of the second detector and plural detection regions in a second direction that intersects the first direction, and the controller selects the first detector in a case where, among plural detection region rows each configured by plural detection regions lined up along the first direction, there is no detection region row in which the percentage of detection regions whose deviation in detected focus position with respect to the focus position detected in the reference detection region among the plural detection regions is within the preset threshold value exceeds a set value and selects the second detector in a case where, among the plural detection region rows, there is a detection region row in which the percentage of detection regions whose deviation in detected focus position with respect to the focus position detected in the reference detection region is within the threshold value exceeds the set value.

10. The imaging device according to claim 2, wherein the plural detection regions are configured by adjacently disposing, in a matrix, plural detection regions in a first direction that is a phase-difference detection direction of the second detector and plural detection regions in a second direction that intersects the first direction, and the controller selects the first detector in a case where, among plural detection region rows each configured by plural detection regions lined up along the first direction, there is no detection region row in which the percentage of detection regions whose deviation in detected focus position with respect to the focus position detected in the reference detection region among the plural detection regions is within the preset threshold value exceeds a set value and selects the second detector in a case where, among the plural detection region rows, there is a detection region row in which the percentage of detection regions whose deviation in detected focus position with respect to the focus position detected in the reference detection region is within the threshold value exceeds the set value.

11. The imaging device according to claim 1, wherein the plural detection regions are configured by adjacently disposing, in a matrix, plural detection regions in a first direction that is a phase-difference detection direction of the second detector and plural detection regions in a second direction that intersects the first direction, and the controller selects the first detector in a case where, among plural detection region columns each configured by plural detection regions lined up along the second direction, detection region columns in which the percentage of detection regions whose deviation in detected focus position with respect to the focus position detected in the reference detection region among the plural detection regions is within the preset threshold value exceeds a set value are not continuous in a number equal to or greater than a predetermined number along the first direction and selects the second detector in a case where detection region columns in which the percentage of detection regions whose deviation in detected focus position is within the threshold value exceeds the set value are continuous in a number equal to or greater than the predetermined number along the first direction.

12. The imaging device according to claim 2, wherein the plural detection regions are configured by adjacently disposing, in a matrix, plural detection regions in a first direction that is a phase-difference detection direction of the second detector and plural detection regions in a second direction that intersects the first direction, and the controller selects the first detector in a case where, among plural detection region columns each configured by plural detection regions lined up along the second direction, detection region columns in which the percentage of detection regions whose deviation in detected focus position with respect to the focus position detected in the reference detection region among the plural detection regions is within the preset threshold value exceeds a set value are not continuous in a number equal to or greater than a predetermined number along the first direction and selects the second detector in a case where detection region columns in which the percentage of detection regions whose deviation in detected focus position is within the threshold value exceeds the set value are continuous in a number equal to or greater than the predetermined number along the first direction.

13. The imaging device according to claim 3, wherein the plural detection regions are configured by adjacently disposing, in a matrix, plural detection regions in a first direction that is a phase-difference detection direction of the second detector and plural detection regions in a second direction that intersects the first direction, and the controller selects the first detector in a case where, among plural detection region columns each configured by plural detection regions lined up along the second direction, detection region columns in which the percentage of detection regions whose deviation in detected focus position with respect to the focus position detected in the reference detection region among the plural detection regions is within the preset threshold value exceeds a set value are not continuous in a number equal to or greater than a predetermined number along the first direction and selects the second detector in a case where detection region columns in which the percentage of detection regions whose deviation in detected focus position is within the threshold value exceeds the set value are continuous in a number equal to or greater than the predetermined number along the first direction.

14. The imaging device according to claim 7, wherein the plural detection regions are configured by adjacently disposing, in a matrix, plural detection regions in a first direction that is a phase-difference detection direction of the second detector and plural detection regions in a second direction that intersects the first direction, and the controller selects the first detector in a case where, among plural detection region columns each configured by plural detection regions lined up along the second direction, detection region columns in which the percentage of detection regions whose deviation in detected focus position with respect to the focus position detected in the reference detection region among the plural detection regions is within the preset threshold value exceeds a set value are not continuous in a number equal to or greater than a predetermined number along the first direction and selects the second detector in a case where detection region columns in which the percentage of detection regions whose deviation in detected focus position is within the threshold value exceeds the set value are continuous in a number equal to or greater than the predetermined number along the first direction.

15. The imaging device according to claim 1, wherein while the acquiring unit is causing the processing that detects the focus positions of the plural detection regions to be repeated by the first detector, the acquiring unit causes focus control of the optical system using the focus position detected by the first detector to be performed by the focus controller and, when focusing is instructed via the instructing unit, also acquires the focus evaluation values of the plural detection regions computed immediately before by the first detector, and the controller selects the first detector or the second detector on the basis of the deviations in the focus positions of the plural detection regions acquired by the acquiring unit in a case where the optical system is in a focused state when focusing has been instructed via the instructing unit and selects the first detector or the second detector on the basis of the sizes of and the deviations in the focus evaluation values of the plural detection regions acquired by the acquiring unit in a case where the optical system is not in a focused state when focusing has been instructed via the instructing unit.

16. The imaging device according to claim 2, wherein while the acquiring unit is causing the processing that detects the focus positions of the plural detection regions to be repeated by the first detector, the acquiring unit causes focus control of the optical system using the focus position detected by the first detector to be performed by the focus controller and, when focusing is instructed via the instructing unit, also acquires the focus evaluation values of the plural detection regions computed immediately before by the first detector, and the controller selects the first detector or the second detector on the basis of the deviations in the focus positions of the plural detection regions acquired by the acquiring unit in a case where the optical system is in a focused state when focusing has been instructed via the instructing unit and selects the first detector or the second detector on the basis of the sizes of and the deviations in the focus evaluation values of the plural detection regions acquired by the acquiring unit in a case where the optical system is not in a focused state when focusing has been instructed via the instructing unit.

17. The imaging device according to claim 1, wherein the acquiring unit causes processing that detects photometric values when the focal point position is in each position and processing that determines whether or not there is a high-luminance region within the detection regions to be performed in addition to the processing that detects the focus positions for each of the plural detection regions in the image by the first determining unit, and when focusing is instructed via the instructing unit, the acquiring unit acquires the focus positions of the plural detection regions detected immediately before by the first detector, the photometric values of the plural detection regions when the focal point position is in each position, and the determination result of whether or not there is a high-luminance region in the plural detection regions, and the imaging device further comprises an updating unit that updates, among the focus positions of the plural detection regions acquired by the acquiring unit, focus positions in detection regions for which the determination result acquired by the acquiring unit is that there is a high-luminance region to positions when the photometric values of the detection regions acquired by the acquiring unit become a minimum.

18. The imaging device according to claim 2, wherein the acquiring unit causes processing that detects photometric values when the focal point position is in each position and processing that determines whether or not there is a high-luminance region within the detection regions to be performed in addition to the processing that detects the focus positions for each of the plural detection regions in the image by the first determining unit, and when focusing is instructed via the instructing unit, the acquiring unit acquires the focus positions of the plural detection regions detected immediately before by the first detector, the photometric values of the plural detection regions when the focal point position is in each position, and the determination result of whether or not there is a high-luminance region in the plural detection regions, and the imaging device further comprises an updating unit that updates, among the focus positions of the plural detection regions acquired by the acquiring unit, focus positions in detection regions for which the determination result acquired by the acquiring unit is that there is a high-luminance region to positions when the photometric values of the detection regions acquired by the acquiring unit become a minimum.

19. A method for controlling an imaging device comprising capturing by an imaging unit that includes an imaging element in which phase-difference detection pixels are disposed in a partial region within a light-receiving surface, a subject with light made incident on the light-receiving surface of the imaging element via an optical system whose focal point position is movable, computing by a first detector which, on the basis of image signals obtained by image capture by the imaging unit, repeatedly computes, while moving the focal point position of the optical system, a focus evaluation value within a detection region set in an image expressed by the image signals and detects a focus position in the detection region from the relationship between the focal point positions and the focus evaluation values, and detecting by a second detector a focus position on the basis of detection signals output from the phase-difference detection pixels, wherein processing by an acquiring unit that detects focus positions of plural detection regions set in the image to be repeated by the first detector and, when focusing is instructed via an instructing unit, acquires the focus positions of the plural detection regions detected immediately before by the first detector, and controlling, when focusing is instructed via the instructing unit, a controller that selects the first detector in a case where the number of detection regions whose deviation in detected focus position with respect to a focus position detected in a reference detection region among the plural detection regions is within a preset threshold value is less than a predetermined value, selects the second detector in a case where the number of detection regions whose deviation in detected focus position is within the threshold value is equal to or greater than the predetermined value, causes focus position detection to be performed by the selected detector, and causes focus control of the optical system by a focus controller to be performed using the focus position detected by the selected detector.

20. A non-transitory computer-readable storage medium storing a control program for controlling an imaging device comprising an imaging unit that includes an imaging element in which phase-difference detection pixels are disposed in a partial region within a light-receiving surface and captures a subject with light made incident on the light-receiving surface of the imaging element via an optical system whose focal point position is movable, a first detector which, on the basis of image signals obtained by image capture by the imaging unit, repeatedly computes, while moving the focal point position of the optical system, a focus evaluation value within a detection region set in an image expressed by the image signals and detects a focus position in the detection region from the relationship between the focal point positions and the focus evaluation values, and a second detector that detects a focus position on the basis of detection signals output from the phase-difference detection pixels, the control program causing a computer disposed on the imaging device to function as an acquiring unit that causes processing that detects focus positions of plural detection regions set in the image to be repeated by the first detector and, when focusing is instructed via an instructing unit, acquires the focus positions of the plural detection regions detected immediately before by the first detector, and a controller which, when focusing is instructed via the instructing unit, selects the first detector in a case where the number of detection regions whose deviation in detected focus position with respect to a focus position detected in a reference detection region among the plural detection regions is within a preset threshold value is less than a predetermined value, selects the second detector in a case where the number of detection regions whose deviation in detected focus position is within the threshold value is equal to or greater than the predetermined value, causes focus position detection to be performed by the selected detector, and causes focus control of the optical system by a focus controller to be performed using the focus position detected by the selected detector.

\* \* \* \* \*